(12) United States Patent
Damnjanovic et al.

(10) Patent No.: US 9,084,119 B2
(45) Date of Patent: Jul. 14, 2015

(54) CARRIER REUSE IN A MULTICARRIER WIRELESS COMMUNICATION ENVIRONMENT

(75) Inventors: Jelena M. Damnjanovic, Del Mar, CA (US); Naga Bhushan, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 12/652,689

(22) Filed: Jan. 5, 2010

(65) Prior Publication Data

US 2010/0173637 A1 Jul. 8, 2010

Related U.S. Application Data

(60) Provisional application No. 61/143,129, filed on Jan. 7, 2009.

(51) Int. Cl.
*H04W 16/12* (2009.01)
*H04L 5/00* (2006.01)
*H04W 84/04* (2009.01)

(52) U.S. Cl.
CPC ............ *H04W 16/12* (2013.01); *H04L 5/0007* (2013.01); *H04L 5/0037* (2013.01); *H04L 5/0062* (2013.01); *H04W 84/045* (2013.01)

(58) Field of Classification Search
CPC . H04W 52/34; H04W 52/146; H04W 52/365; H04W 52/346; H04W 72/082; H04W 72/04; H04W 24/02; H04W 52/243; H04W 52/244; H04W 48/08; H04W 84/045; H04W 36/00; H04W 36/20; H04W 40/16; H04W 52/04; H04B 7/0617; H04B 7/0669; H04B 7/0408; H04L 2025/03522; H04J 11/0069; H04J 11/0093

USPC .......... 455/447, 436; 375/300, 219, 267, 260, 375/330, 441, 526, 431; 370/342, 468, 329
See application file for complete search history.

(56) References Cited

U.S. PATENT DOCUMENTS 7,680,475 B2   3/2010  Ji et al.
8,019,017 B2 *  9/2011  Ahn et al. .................... 375/300
(Continued)

FOREIGN PATENT DOCUMENTS

CN       1902966 A    1/2007
CN       1989775 A    6/2007
(Continued)

OTHER PUBLICATIONS

International Search Report and Written Opinion—PCT/US2010/020382, International Search Authority—European Patent Office—Oct. 18, 2010.
(Continued)

*Primary Examiner* — Nizar Sivji
(74) *Attorney, Agent, or Firm* — Paul Kuo

(57) ABSTRACT

Systems and methodologies are described that facilitate employing fractional frequency reuse within carriers in a multicarrier heterogeneous wireless communication environment. Each carrier can be divided into a plurality of frequency reuse sets. Moreover, each of the frequency reuse sets from each carrier can be categorized as being for one of unrestricted reuse or restricted reuse. Further, a downlink transmission can be scheduled upon resources of at least a first subset of frequency reuse sets from a first carrier bandwidth and a second subset of frequency reuse sets from a second carrier bandwidth. For example, the resources can be scheduled based upon a power class of a base station, categorizations of the frequency reuse set (e.g., unrestricted reuse versus restricted reuse, . . . ), and/or received feedback related to downlink channel conditions.

50 Claims, 14 Drawing Sheets

(56) References Cited

U.S. PATENT DOCUMENTS

| | | | |
|---|---|---|---|
| 8,023,459 B2* | 9/2011 | Kang et al. | 370/329 |
| 8,611,814 B2* | 12/2013 | Hart | 455/16 |
| 2005/0096062 A1 | 5/2005 | Ji et al. | |
| 2005/0250502 A1* | 11/2005 | Laroia et al. | 455/447 |
| 2006/0014542 A1* | 1/2006 | Khandekar et al. | 455/447 |
| 2007/0287457 A1* | 12/2007 | Yeh et al. | 455/435.1 |
| 2007/0291635 A1 | 12/2007 | Yang et al. | |
| 2009/0170528 A1* | 7/2009 | Bull et al. | 455/456.2 |
| 2010/0110983 A1* | 5/2010 | Fu | 370/328 |
| 2010/0113027 A1* | 5/2010 | Hsu | 455/436 |
| 2010/0136989 A1* | 6/2010 | Westerberg et al. | 455/450 |
| 2010/0159917 A1* | 6/2010 | Majmundar et al. | 455/423 |
| 2012/0122472 A1* | 5/2012 | Krishnamurthy et al. | 455/456.1 |

FOREIGN PATENT DOCUMENTS

| | | |
|---|---|---|
| CN | 1994018 A | 7/2007 |
| CN | 101019362 A | 8/2007 |
| JP | 2009021787 A | 1/2009 |
| JP | 5211974 B2 | 6/2013 |
| KR | 20070042181 A | 4/2007 |
| WO | 2005062798 A2 | 7/2005 |
| WO | WO2006020032 | 2/2006 |
| WO | WO2007022631 | 3/2007 |

OTHER PUBLICATIONS

Tae-Hwan Kim et al: "Throughput Enhancement of Macro and Femto Networks Frequency Reuse and Pilot Sensing" Performance, Computing and Communications Conference, 2008. IPCCC 2008. IEEE International, IEEE, Piscataway, NJ, Dec. 7, 2008, pp. 390-394, XP031404336 ISBN: 978-1-4244-3368-1.

"Range expansion for efficient support of heterogeneous networks", Qualcomm Europe, 3GPP TSG-RAN WG1 #54, R1-083195, Aug. 18-22, 2008, Jeju, S. Korea.

"ComP Cooperative silencing Hotzone DL Performance", Qualcomm Europe, 3GPP TSH-RAN WG1 #56bis, R1-091452, Mar. 23-27, 2009, Seoul, Korea.

"Notion of Anchor Carrier in LTE-A", Qualcomm Europe, 3GPP TSG RAN WG1 #56bis, R1-091458, Mar. 23-27, 2009, Seoul, Korea.

Ali S.H., et al., "Dynamic Frequency Allocation in Fractional Frequency Reused OFDMA Networks", GLOBECOM Workshops, 2008 IEEE, Dec. 4, 2008, pp. 1-6.

Chen Y., et al., "Fractional Frequency Reuse in mobile WiMAX", Communications and Networking in China, 2008, ChinaCom 2008, Aug. 27, 2008.

Hitachi, Ltd., "Resource management cooperation scheme for CoMP", 3GPP R1-083690, Oct. 3, 2008.

Jitsukawa D., et al., "Inter-cell Interference Coordination for Downlink Control Signals in Heterogeneous Network," Proceedings 1 of the 2010 IEICE Society Conference, Aug. 31, 2010, p. 393, B-5-39.

Li Z., et al., "A hybrid inter-cell interference mitigation scheme for OFDMA system", Communication Systems, 2008. ICCS 2008., Nov. 21, 2008, pp. 656-660.

Nakayama T., et al., "A Study on Downlink ICIC for LTE-Advanced Heterogeneous Network Deployment," Technical Report of the Institute of Electronics, Information and Communication Engineers, Apr. 19, 2010, vol. 110, No. 19, pp. 1-6, RCS2010-1.

Nakayama T., et al., "A Study on Hotzone First Serving Cell Selection Scheme for LTE-Advanced Heterogeneous Network Deployment," Technical Report of the Institute of Electronics, Information and Communication Engineers, Feb. 24, 2010, vol. 109, No. 440, pp. 397-402, RCS2009-325.

NTT Docomo Inc, "Inter-cell Radio Resource Management for Heterogeneous Network", 3GPP R1-084253, Nov. 14, 2008.

Qualcomm Europe: Carrier Aggregation in Heterogeneous Networks 3GPP Draft; R1-090357, 3rd Generation Partnership Project (3GPP), Mobile Competence Centre; 650, Route Des Lucioles; F-06921 Sophia-Antipolis Cedex; France, no Ljubljana; Jan. 8, 2009, XP050318263 the whole document.

Qualcomm Europe, "Serving cell association in heterogeneous networks", 3GPP TSG-RAN WG1 #54bis R1-083814, Sep. 29, 2008, P.1-P.3, URL, http://www.3gpp.org/ftp/tsg_ran/WG1_RL1/TSGR1_54b/Docs/R1-083814.zip.

Qualcomm Europe, "New Interference Scenarios in LTE-Advanced", 3GPP R1-083809, Oct. 3, 2008.

Qualcomm Europe: Notion of Anchor Carrier in LTE-A 3GPP Draft; R1-090356, 3rd Generation Partnership Project (36PP), Mobile Competence Centre ; 650, Route Des Lucioles ; F-06921 Sophia-Antipolis Cedex ; France, no Ljubljana; Jan. 8, 2009, XP050318262 the whole document.

Qualcomm Europe: "Range expansion for efficient support of heterogeneous networks" 3GPP Draft; R1-083813, 3rd Generation Partnership Project (3GPP), Mobile Competence Centre ; 650, Route Des Lucioles ; F-06921 Sophia-Antipolis Cedex ; France, no. Prague, Czech Republic; (Sep. 29-Oct. 3, 2008), Sep. 24, 2008, XP050317137.

Shariat M., et al., "On the efficiency of interference coordination schemes in emerging cellular wireless networks," Personal, Indoor and Mobile Radio Communications, PIMRC 2008, Sep. 18, 2008.

Taiwan Search Report—TW099100298—TIPO—Mar. 17, 2014.

* cited by examiner

CARRIER REUSE IN A MULTICARRIER WIRELESS COMMUNICATION ENVIRONMENT

CROSS-REFERENCE TO RELATED APPLICATIONS

This application claims the benefit of U.S. Provisional Patent Application Ser. No. 61/143,129 entitled "A METHOD AND APPARATUS FOR IMPROVING CARRIER REUSE IN A WIRELESS COMMUNICATION" which was filed Jan. 7, 2009. The entirety of the aforementioned application is herein incorporated by reference.

BACKGROUND

I. Field

The following description relates generally to wireless communications, and more particularly to employing fractional frequency reuse (FFR) with multiple carriers in a heterogeneous wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Heterogeneous wireless communication systems commonly can include various types of base stations, each of which can be associated with differing cell sizes and power classes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to access terminals using a wireless technology (e.g., 3GPP Universal Mobile Telecommunications System (UMTS) or Long Term Evolution (LTE), 1× Evolution-Data Optimized (1xEV-DO), . . . ) to communicate with the access terminals and an existing broadband Internet connection (e.g., digital subscriber line (DSL), cable, . . . ) for backhaul. A femto cell base station can also be referred to as a Home Node B (HNB), a femto cell, a closed subscriber group (CSG) cell, or the like. The pico cell base station is another class of base station that oftentimes is included in heterogeneous wireless communication systems. Pico cell base stations typically transmit at lower power as compared to macro cell base stations and oftentimes cover small areas (e.g., in a building, in an aircraft, . . . ). Further, pico cell base stations are oftentimes located within coverage areas of macro cell base stations. Moreover, heterogeneous wireless communication systems can include other types of base stations such as micro cell base stations or the like.

Conventional wireless communication systems oftentimes utilize one carrier for downlink operation and one carrier for uplink operation. More recently, wireless communication systems that support utilization of multiple carriers on the uplink and/or multiple carriers on the downlink have become more prevalent. Accordingly, an access terminal can transmit and/or receive data on multiple carriers. For instance, larger system bandwidths (e.g., beyond 20 MHz, . . . ) for downlink operation can be yielded by supporting carrier aggregation. Common approaches, however, can inadequately manage interference between base stations of different power classes within a multicarrier heterogeneous network deployment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of fractional frequency reuse within carriers in a multicarrier heterogeneous wireless communication environment. Each carrier can be divided into a plurality of frequency reuse sets. Moreover, each of the frequency reuse sets from each carrier can be categorized as being for one of unrestricted reuse or restricted reuse. Further, a downlink transmission can be scheduled upon resources of at least a first subset of frequency reuse sets from a first carrier bandwidth and a second subset of frequency reuse sets from a second carrier bandwidth. For example, the resources can be scheduled based upon a power class of a base station, categorizations of the frequency reuse set (e.g., unrestricted reuse versus restricted reuse, . . . ), and/or received feedback related to downlink channel conditions.

According to related aspects, a method that facilitates reusing carriers in a multicarrier heterogeneous wireless communication environment is described herein. The method can include scheduling a downlink transmission upon resources of at least a first subset of frequency reuse sets from a first carrier bandwidth and a second subset of frequency reuse sets from a second carrier bandwidth. Further, the method can comprise sending the downlink transmission utilizing the resources as scheduled.

Another aspect relates to a wireless communications apparatus. The wireless communications apparatus can include a memory that retains instructions related to scheduling a downlink transmission upon resources of at least a first subset of frequency reuse sets from a first carrier bandwidth and a second subset of frequency reuse sets from a second carrier bandwidth based upon one or more of a power class of a base station, categorizations of the frequency reuse sets from the first carrier bandwidth and the second carrier bandwidth, or an interference level experienced by an access terminal, and sending the downlink transmission utilizing the resources as scheduled. Further, the wireless communications apparatus can include a processor, coupled to the memory, configured to execute the instructions retained in the memory.

Yet another aspect relates to a wireless communications apparatus that enables allocating resources in a multicarrier heterogeneous wireless communication environment. The wireless communications apparatus can include means for scheduling a downlink transmission upon resources of at least a first subset of frequency reuse sets from a first carrier bandwidth and a second subset of frequency reuse sets from a second carrier bandwidth based upon one or more of a power class of a base station, categorizations of the frequency reuse sets from the first carrier bandwidth and the second carrier bandwidth, or received downlink channel condition feedback. Moreover, the wireless communications apparatus can include means for sending the downlink transmission utilizing the resources as scheduled.

Still another aspect relates to a computer program product that can comprise a computer-readable medium. The computer-readable medium can include code for assigning resources of at least a first subset of frequency reuse sets from a first carrier bandwidth and a second subset of frequency reuse sets from a second carrier bandwidth for a downlink transmission. Further, the computer-readable medium can comprise code for sending the downlink transmission via the resources as assigned.

In accordance with another aspect, a wireless communications apparatus can include a processor, wherein the processor can be configured to recognize an interference level experienced by an access terminal based upon received feedback. Moreover, the processor can be configured to schedule a downlink transmission upon resources of at least a first subset of frequency reuse sets from a first carrier bandwidth and a second subset of frequency reuse sets from a second carrier bandwidth based upon one or more of a power class of a base station, categorizations of the frequency reuse sets from the first carrier bandwidth and the second carrier bandwidth, or the interference level experienced by the access terminal. Further, the processor can be configured to send the downlink transmission utilizing the resources as scheduled.

According to other aspects, a method that facilitates operating in a multicarrier heterogeneous wireless communication environment is described herein. The method can include monitoring downlink channel conditions. Moreover, the method can comprise transmitting feedback corresponding to the downlink channel conditions. Further, the method can include receiving a downlink transmission upon resources of at least a first subset of frequency reuse sets from a first carrier bandwidth and a second subset of frequency reuse sets from a second carrier bandwidth assigned based at least in part upon the feedback.

Another aspect relates to a wireless communications apparatus. The wireless communications apparatus can include a memory that retains instructions related to monitoring downlink channel conditions, transmitting feedback corresponding to the downlink channel conditions, and receiving a downlink transmission upon resources of at least a first subset of frequency reuse sets from a first carrier bandwidth and a second subset of frequency reuse sets from a second carrier bandwidth assigned based upon the feedback, a power class of a base station, and categorizations of the frequency reuse sets from the first carrier bandwidth and the second carrier bandwidth. Further, the wireless communications apparatus can include a processor, coupled to the memory, configured to execute the instructions retained in the memory.

Yet another aspect relates to a wireless communications apparatus that enables operating in a multicarrier heterogeneous wireless communication environment. The wireless communications apparatus can include means for measuring downlink interference. Further, the wireless communications apparatus can include means for reporting the downlink interference. Moreover, the wireless communications apparatus can include means for receiving a downlink transmission upon resources of at least a first subset of frequency reuse sets from a first carrier bandwidth and a second subset of frequency reuse sets from a second carrier bandwidth allocated based at least in part upon the downlink interference.

Still another aspect relates to a computer program product that can comprise a computer-readable medium. The computer-readable medium can include code for reporting measured downlink interference. Moreover, the computer-readable medium can comprise code for obtaining a downlink transmission upon resources of at least a first subset of frequency reuse sets from a first carrier bandwidth and a second subset of frequency reuse sets from a second carrier bandwidth allocated based at least in part upon the measured downlink interference.

In accordance with another aspect, a wireless communications apparatus can include a processor, wherein the processor can be configured to monitor downlink channel conditions. Moreover, the processor can be configured to transmit feedback corresponding to the downlink channel conditions. Further, the processor can configured to receive a downlink transmission upon resources of at least a first subset of frequency reuse sets from a first carrier bandwidth and a second subset of frequency reuse sets from a second carrier bandwidth assigned based upon the feedback, a power class of a base station, and categorizations of the frequency reuse sets from the first carrier bandwidth and the second carrier bandwidth.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
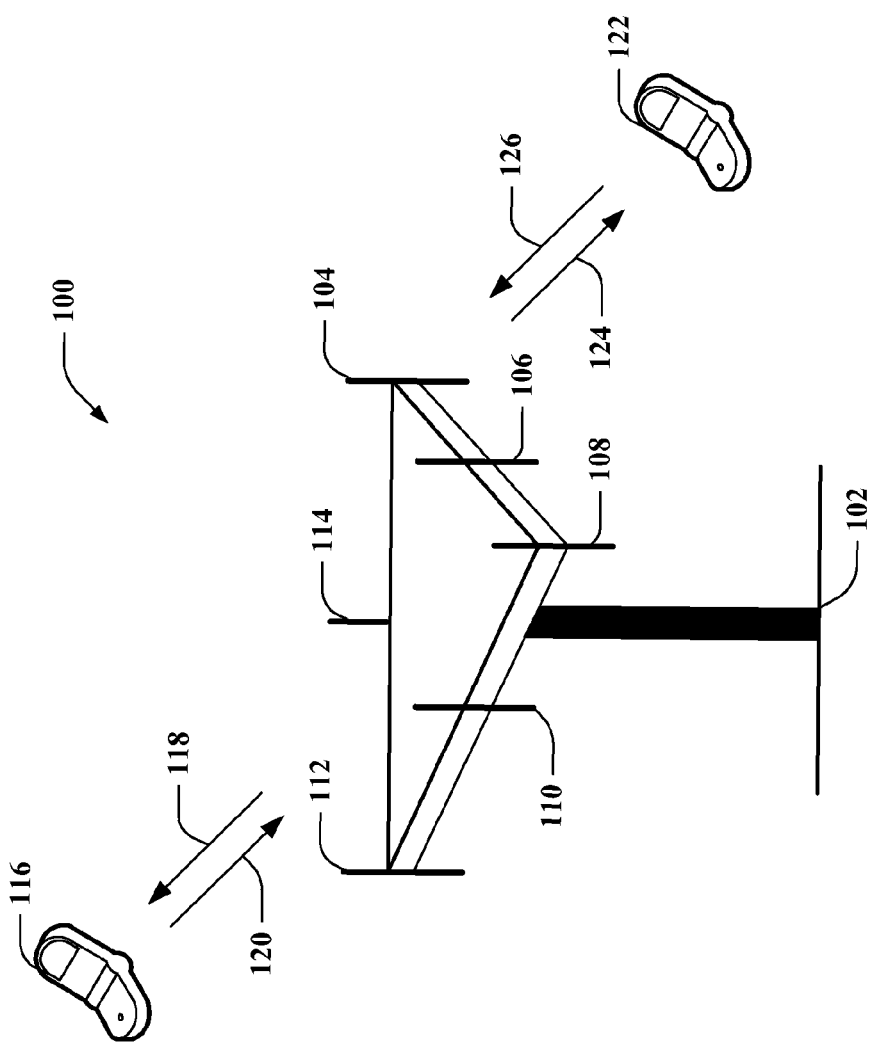
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can employ a fractional frequency reuse (FFR) scheme within each carrier in a multicarrier heterogeneous wireless communication environment. Accordingly, the multicarrier heterogeneous wireless communication environment can include base stations of different power classes. For instance, base station 102 can be a macro cell base station, a pico cell base station, a femto cell base station, a micro cell base station, or the like. Moreover, neighbor base station(s) (not shown) can be located nearby base station 102, and these neighbor base station(s) can be macro cell base station(s), pico cell base station(s), femto cell base station(s), micro cell base station(s), etc. Additionally or alternatively, base stations included in the multicarrier heterogeneous wireless communication environment can include base stations of different access classes (e.g., open access base station(s), closed subscriber group (CSG) base station(s), . . . ). Further, base stations belonging to the different power classes and/or access classes can operate on the same system bandwidth. Much of the discussion herein relates to heterogeneous wireless communication environments that include macro cell base station(s) and pico cell base station(s); however, it is to be appreciated that the description herein can be extended to heterogeneous wireless communication environments that include other types of base station(s) (e.g., femto cell base station(s), micro cell base station(s), . . . ).

A plurality of carriers can be leveraged in system 100. Thus, base station 102 can transmit data to each access terminal 116, 122 on multiple carriers over the downlink and/or receive data from each access terminal 116, 122 on multiple carriers over the uplink. While many of the examples described herein relate to utilization of three carriers, it is to be appreciated that any number of carriers are intended to fall within the scope of the hereto appended claims.

System 100 can support a fractional frequency reuse scheme within each of the plurality of carriers. Such frequency reuse scheme can be more dynamic than traditional carrier partitioning. For instance, each carrier bandwidth can be divided into a plurality of frequency reuse sets. Access terminals 116, 122 in different channel conditions can be associated with different frequency reuse, and thus, can belong to different frequency reuse sets. Application of fractional frequency reuse to base stations, such as base station 102, in heterogeneous wireless communication environments can allow for a shared carrier to be efficiently utilized with finer frequency resource partitioning. Such partitioning can be adapted faster than conventional carrier partitioning since a bandwidth occupied by a base station need not be changed over time.

Figure 2:
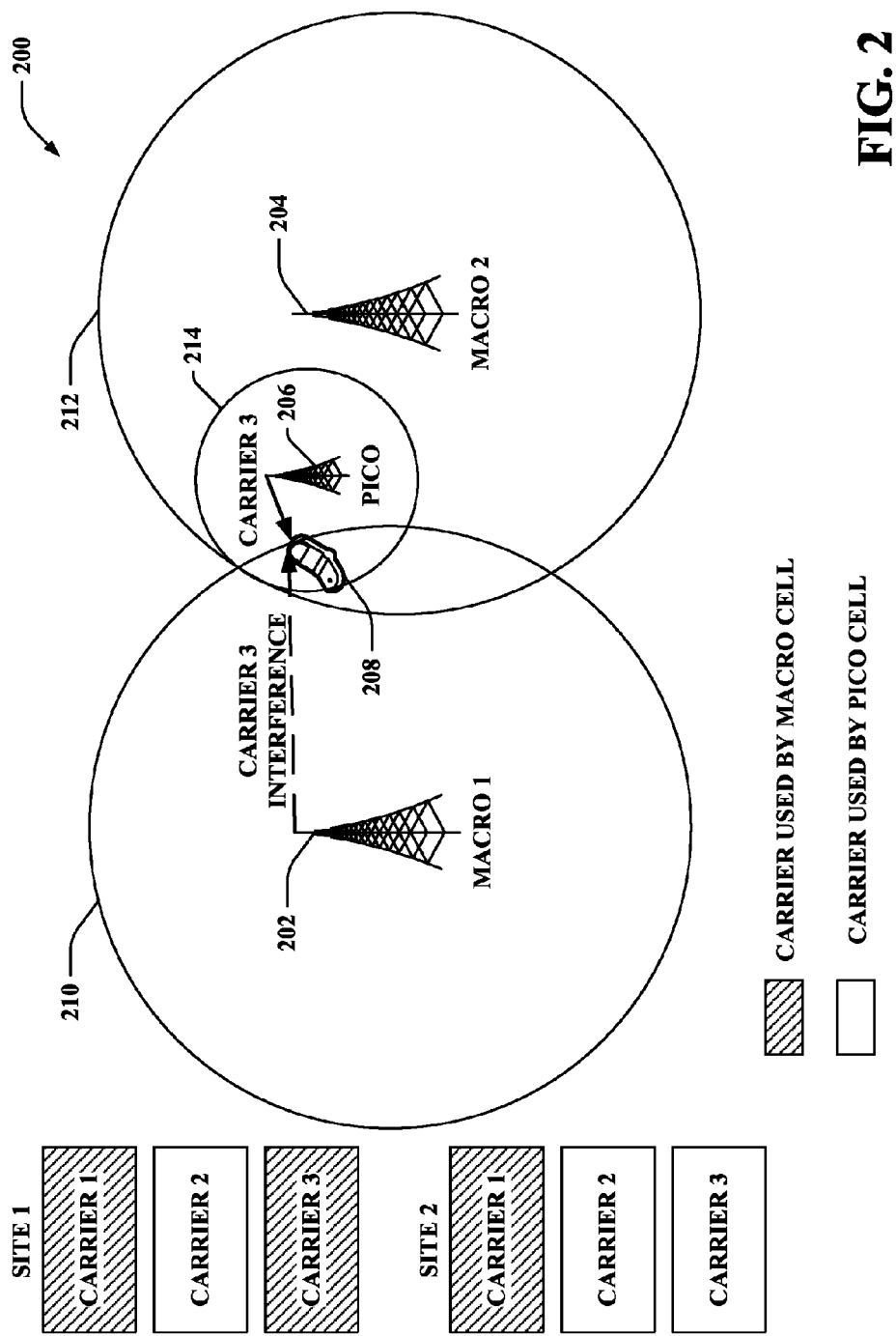
FIG. 2 is an illustration of an example system that leverages carrier partitioning on a downlink in a multicarrier heterogeneous wireless communication environment.

Referring to FIG. 2, illustrated is an example system 200 that leverages carrier partitioning on a downlink in a multicarrier heterogeneous wireless communication environment. As depicted, system 200 includes a macro cell base station 1 202, a macro cell base station 2 204, a pico cell base station 206, and an access terminal 208. It is contemplated, however, that system 200 can include substantially any number of base stations and/or substantially any number of access terminals and is not limited to the illustrated example. While system 200 describes use of carrier partitioning, it is to be appreciated that the claimed subject matter is not so limited.

As shown, macro cell base station 1 202 can be associated with a downlink coverage area 210, macro cell base station 2 202 can be associated with a downlink coverage area 212, and pico cell base station 206 can be associated with a downlink coverage area 214. Further, pico cell base station 206 can be positioned within downlink coverage area 212 of macro cell base station 2 204.

System 200 can support utilization of multiple downlink carriers. For instance, three downlink carriers can be employed in system 200; however, the claimed subject matter is not so limited. In multicarrier heterogeneous system 200, base stations 202-206 can be configured such that a certain power class and/or access class is allocated a subset of the downlink carriers, while that power class and/or access class is inhibited from transmitting on the remaining downlink carriers. As a result, low power base stations (e.g., micro cell base stations, pico cell base stations, femto cell base stations, . . . ) in vicinity of a high power base station (e.g., macro cell base station, . . . ) can use carriers not used by the high-power base station to serve their own access terminals without being interfered by the downlink transmission from the high power base station. Similarly, open access base stations in vicinity of a CSG base station (e.g. closed home evolved node B (He-NodeB), . . . ) can use carriers not used by the CSG base station to serve its own users, without being impacted by the interference from the CSG base station, thereby mitigating outage to non-allowed users in the radio frequency (RF) coverage of the CSG base station. Allocation of distinct carriers for base stations of different power classes can enable range expansion (e.g., associating an access terminal with a base station that has a relatively weak downlink received signal such as a relatively weak Reference Signal Received Power (RSRP) in order to achieve performance benefits, . . . ) in the case of open access base stations. Range expansion can be used to achieve better load sharing between different base stations in a network, resulting in significantly improved user throughput distribution.

Carrier allocation to different classes of base stations (e.g., power classes and/or access classes, . . . ) can be a long-term resource partitioning scheme that can be updated on a relatively slow basis. For instance, information concerning carrier allocation can be conveyed to access terminals in system information. Moreover, a period of time before a change (e.g., indicated in system information, . . . ) becomes valid can be leveraged to provide for a transition period and prevent data loss. According to a further example, additional system information can be distributed; following this example, a first portion of system information can identify a new carrier allocation that takes effect at a certain time and a second portion of system information can identify an old, valid carrier allocation to be employed until the certain time to enable smooth transition there between.

As depicted in system 200, neighboring base stations of the same power/access class can have different carrier allocations. Per the illustrated example, at site 1 (e.g., corresponding to downlink coverage area 210, . . . ), macro cell base station 1 202 can be allocated carriers 1 and 3, while pico cell base station(s) located within downlink coverage area 210 can be allocated carrier 2. Further, at site 2 (e.g., corresponding to downlink coverage area 212, . . . ), macro cell base station 2 204 can be allocated carrier 1, while pico cell base station(s) (e.g., pico cell base station 206, . . . ) located within downlink coverage area 212 can be allocated carriers 2 and 3. Accordingly, pico cell base station(s) in close proximity of macro cell base station 1 202 (e.g., within downlink coverage area 210, . . . ) can use carrier 2 without being impacted by downlink interference from macro cell base station 1 202. Similarly, pico cell base station(s) in close proximity of macro cell base station 2 204 (e.g., within downlink coverage area 212, . . . ) can use carriers 2 and 3 without being impacted by downlink interference from macro cell base station 2 204.

It is further contemplated that pico cell base station(s) can leverage carrier(s) allocated to the corresponding macro cell base station associated with the downlink coverage area in which the pico cell base station(s) are respectively positioned; however, the downlink coverage area for the pico cell base station(s) corresponding to the carrier(s) allocated to the macro cell base station can be significantly smaller than the downlink coverage area corresponding to carrier(s) allocated to the pico cell base station(s). For example, pico cell base station(s) positioned within downlink coverage area 210 (e.g., located towards an edge of downlink coverage area 210 away from macro cell base station 1 202, . . . ) can have a small downlink coverage area (e.g., for synchronization and/or control channel, . . . ) on carriers 1 and 3, while having a significantly larger downlink coverage area on carrier 2. Similarly, pico cell base station(s) located within downlink coverage area 212 (e.g., located towards an edge of downlink coverage area 212 away from macro cell base station 2 204, . . . ) can have a small downlink coverage area on carrier 1, while having a significantly larger downlink coverage area on carriers 2 and 3.

In the example illustrated in system 200, allocating a subset of carriers to macro cell base stations 202-204 can enable multiple pico cell base stations (e.g., pico cell base station 206, disparate pico cell base station(s) (not shown), . . . ) in vicinity of macro cell base stations 202-204 to significantly expand their coverage on carriers not used by macro cell base stations 202-204. Thus, the pico cell base stations can serve their respective access terminal(s) on different carriers based on a strategic scheduling technique.

Moreover, access terminals can report significant interference from other macro cell base station(s) at other sites on certain carrier(s). Hence, access terminals can be scheduled on disparate carriers to avoid such reported interference. For example, as depicted, access terminal 208 can report significant interference on carrier 3 from macro cell base station 1 202 (e.g., located at a different site, . . . ) to serving pico cell base station 206. Accordingly, pico cell base station 206 can schedule access terminal 208 on carrier 2, while inhibiting downlink transmission to access terminal 208 on carrier 3, based upon the reported interference obtained from access terminal 208.

According to another illustration, additional interference coordination between cells can be invoked. Pursuant to the above example where access terminal 208 reports significant interference on carrier 3 caused by macro cell base station 1 202 to serving pico cell base station 206, pico cell base station 206 can schedule access terminal 208 on carrier 3 by leveraging one or more interference coordination mechanisms. For instance, an interference coordination mechanism can include dynamic or semi-static power adjustment of macro cell base station(s) on the interfering carrier (e.g., power adjustment of macro cell base station 1 202 on carrier 3 per the aforementioned example, . . . ). According to another illustration, an interference coordination mechanism can include certain time/frequency reuse on interfering carrier resources. However, the claimed subject matter is not limited to the foregoing.

Figure 3:
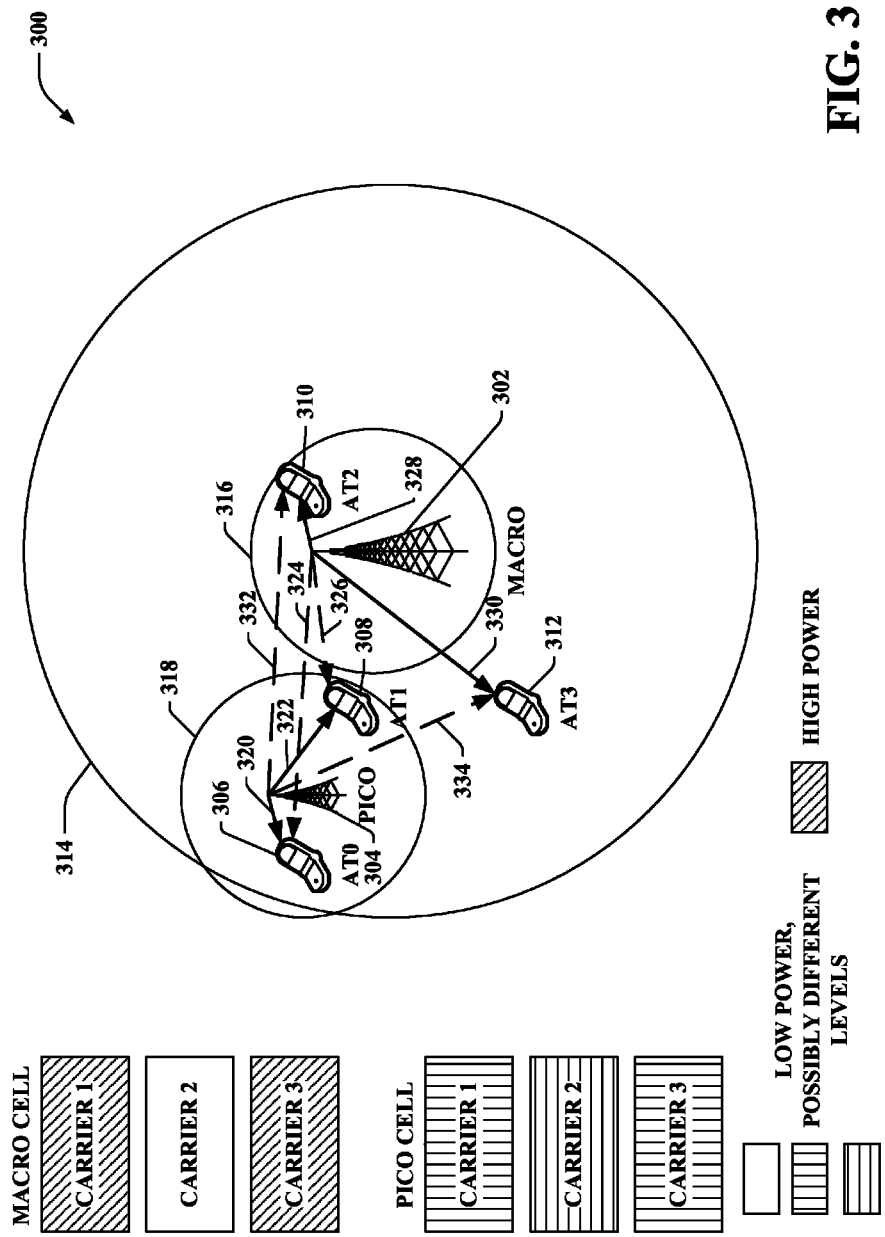
FIG. 3 is an illustration of an example system that implements carrier reuse on a downlink utilizing power control in a wireless communication environment.

Turning to FIG. 3, illustrated is a system 300 that implements carrier reuse on a downlink utilizing power control in a wireless communication environment. System 300 includes a macro cell base station 302, a pico cell base station 304, and a plurality of access terminals (e.g., access terminal (AT) 0 306, access terminal 1 308, access terminal 2 310, and access terminal 3 312, . . . ). Instead of strict carrier partitioning among different base stations (e.g., as described in FIG. 2, . . . ), system 300 can allow use of carriers by base stations of different power classes and/or access classes. Yet, it is to be appreciated that the claimed subject matter is not limited to employing carrier reuse by leveraging power control as described in connection with system 300.

According to an example, component carriers in multicarrier system 300 can be categorized as follows. A component carrier can be an open access shared carrier with unrestricted power. The open access shared carrier with unrestricted power can be used by macro cell base stations and pico cell base stations up to their maximum power. Further, the open access shared carrier with unrestricted power can be inhibited from use by CSG base stations for various transmissions (e.g., Primary Synchronization Signal (PSC), Secondary Synchronization Signal (SSC), Physical Broadcast Channel (PDCH), Physical Downlink Control Channel (PDCCH) channels of LTE Release 8, . . . ).

Another category for a component carrier can be an open access shared carrier with low power. The open access shared carrier with low power can be used by macro cell base stations with low power (e.g., with possible multiple power classes, . . . ). Moreover, the open access shared carrier with low power can be used by pico cell base stations with full power. Further, the open access shared carrier with low power can be inhibited from use by CSG base stations for various transmissions (e.g., PSC, SSC, PDCH, PDCCH channels of LTE Release 8, . . . ).

Alternatively, a component carrier can be categorized as a closed access carrier with low power. The closed access carrier with low power can be used by CSG base stations. Further, the closed access carrier with low power can be employed by macro cell base stations (e.g., with low power, . . . ) and/or pico cell base stations.

This deployment scheme can be related to the anchor carrier concept. An anchor carrier of a base station can be a carrier that enables synchronization, camping and access to users in coverage of that base station. For the deployment under consideration, the anchor carrier(s) of a base station can include those carrier(s) that provide the best coverage for synchronization (e.g., PSC, SSC, PBCH, . . . ) and control channels (e.g., PDCCH, . . . ) of the base station. In particular, the open access shared carrier with unrestricted power can represent the anchor carrier of macro cell base stations (e.g., macro cell base station 302, . . . ). The open access shared carrier with low power can represent the anchor carrier of pico cell base stations (e.g., pico cell base station 304, . . . ). The closed access carrier with low power can represent the anchor carrier of CSG base stations. Thus, access terminals served by a given base station can monitor the anchor carrier(s) of that base station. In addition, dedicated Radio Resource Control (RRC) signaling can inform an access terminal to monitor certain other carriers in addition to the anchor carrier(s); yet, the claimed subject matter is not so limited.

As depicted in FIG. 3, carriers 1 and 3 can be open access shared carriers with unrestricted power, which can be used by macro cell base station 302 and pico cell base station 304 up to their respective maximum powers (e.g., the maximum power level utilized by pico cell base station 304 is low compared to the maximum power level employed by macro cell base station 302, . . . ). Further, carrier 2 can be an open access shared carrier with low power, which can be utilized by macro cell base station 302 with reduced power (e.g., relative to a maximum power level employed by macro cell base station 302, . . . ) and by pico cell base station 304 with its full power (e.g., which is low by configuration, . . . ).

Macro cell base station 302 can be associated with a downlink coverage area 314 when employing carriers 1 and 3 (e.g., when transmitting at a maximum power level using open access shared carriers with unrestricted power, . . . ). Further, macro cell base station 302 can be associated with a downlink coverage area 316 when utilizing carrier 2 (e.g., when transmitting at the reduced power level using the open access shared carrier with low power, . . . ), where downlink coverage area 316 is smaller than downlink coverage area 314. Moreover, pico cell base station 304 can be associated with a downlink coverage area 318; although not shown, it is contemplated that pico cell base station 304 can be associated with downlink coverage areas of different sizes corresponding to different carriers.

In the illustrated example, solid lines can represent a downlink transmission from a serving base station to an access terminal and dashed lines can represent downlink interference from an interfering base station received by an access terminal. As depicted, pico cell base station 304 can serve access terminal 0 306 and access terminal 1 308. Pico cell base station 304 can schedule access terminal 0 306 and access terminal 1 308 on carrier 2 (e.g., downlink transmission 320 and/or downlink transmission 322 can be scheduled on carrier 2, since downlink interference 324 and downlink interference 326 can be weak or lacking on carrier 2, . . . ). Additionally or alternatively, access terminal 0 306 can be scheduled by pico cell base station 304 on carrier 1 and/or carrier 3 (e.g., downlink transmission 320 can be scheduled on carrier 1 and/or carrier 3, . . . ) since interference from macro cell base station 302 seen by access terminal 0 306 on carrier 1 and carrier 3 (e.g., downlink interference 324 on carriers 1 and 3, . . . ) can be weak compared to a signal power received from pico cell base station 304 on such carriers (e.g., high signal to interference plus noise ratio (SINR), . . . ). In contrast, access terminal 1 308 can experience strong interference from macro cell base station 302 on carriers 1 and 3 (e.g., downlink interference 326 on carriers 1 and 3 can be strong due to access terminal 1 308 being located closer to an edge of downlink coverage area 318 and closer to macro cell base station 302 as compared to access terminal 0 306, . . . ). Thus, access terminal 1 308 can be scheduled by pico cell base station 304 on carrier 2 (e.g., downlink transmission 322 can be scheduled on carrier 2, . . . ) if no other interference coordination between macro cell base station 302 and pico cell base station 304 is implemented.

Further, as illustrated, macro cell base station 302 can serve access terminal 2 310 and access terminal 3 312. Macro cell base station 302 can schedule access terminal 2 310 and access terminal 3 312 on carriers 1 and 3 (e.g., downlink transmission 328 and/or downlink transmission 330 can be scheduled on carriers 1 and 3, since downlink interference 332 and downlink interference 334 can be weak or lacking on carriers 1 and 3, . . . ). Additionally or alternatively, access terminal 2 310 can be scheduled by macro cell base station 302 on carrier 2 (e.g., downlink transmission 328 can be scheduled on carrier 2, . . . ), since access terminal 2 310 is close enough to macro cell base station 302 and falls within downlink coverage area 316 (e.g., range of coverage, . . . ) of low power carrier 2 (e.g., downlink interference 332 can be weak or lacking on carrier 2, . . . ). In contrast, access terminal 3 312 is outside of downlink coverage area 316 corresponding to carrier 2 (e.g., due to low transmit power on carrier 2, yet access terminal 3 312 is within downlink coverage area 314 associated with carriers 1 and 3, . . . ), and thus, access terminal 3 312 can be inhibited from being scheduled on carrier 2.

Figure 4:
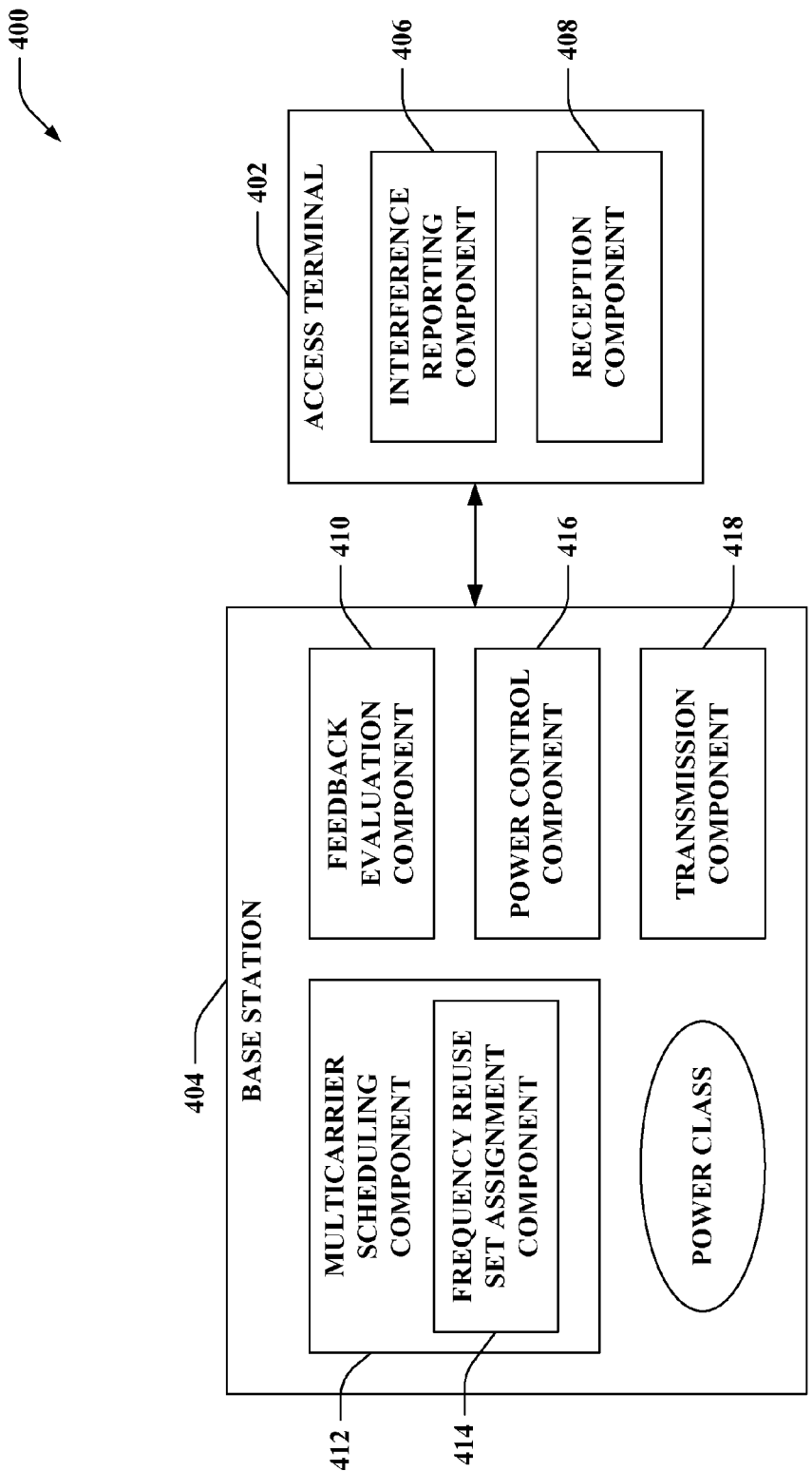
FIG. 4 is an illustration of an example system that employs fractional frequency reuse within carriers in a multicarrier heterogeneous wireless communication environment.

Now referring to FIG. 4, illustrated is a system 400 that employs fractional frequency reuse within carriers in a multicarrier heterogeneous wireless communication environment. System 400 includes an access terminal 402 that can transmit and/or receive information, signals, data, instructions, commands, bits, symbols, and the like. Access terminal 402 can communicate with a base station 404 via the forward link and/or reverse link. Base station 404 can transmit and/or receive information, signals, data, instructions, commands, bits, symbols, and the like. For example, base station 404 can be a macro cell base station, a pico cell base station, a femto cell base station, a micro cell base station, or the like. Further, although not shown, it is contemplated that system 400 can include any number of access terminals similar to access terminal 402 and/or any number of base stations similar to base station 404. Accordingly, neighboring base station(s) (not shown) such as, for instance, macro cell base station(s), pico cell base station(s), femto cell base station(s), micro cell base station(s), a combination thereof, or the like can be positioned within proximity of base station 404.

Access terminal 402 can include an interference reporting component 406 and a reception component 408. Interference reporting component 406 can monitor downlink channel conditions observed at access terminal 402. For instance, interference reporting component 406 can measure downlink signal strengths and/or interference levels on one or more downlink carriers. According to another illustration, interference reporting component 406 can compare measured downlink signal strengths and/or interference levels to respective thresholds (e.g., to evaluate whether the measured interference level exceeds a threshold, . . . ). Further, interference reporting component 406 can transmit feedback related to monitored downlink channel conditions to base station 404. Base station 404 can leverage the feedback from access terminal 402 (e.g., yielded by interference reporting component 406, . . . ) to schedule downlink transmissions to access terminal 402 utilizing frequency reuse sets from a plurality of carriers as part of a fractional frequency reuse scheme. Moreover, reception component 408 can obtain the downlink transmissions sent by base station 404 over the downlink.

Base station 404 can include a feedback evaluation component 410 that obtains and analyzes feedback related to observed downlink channel conditions from access terminal(s). For example, feedback evaluation component 410 can receive the feedback from access terminal 402 (e.g., generated by interference reporting component 406, . . . ). Moreover, feedback evaluation component 410 can recognize the downlink channel conditions (e.g., interference levels, . . . ) experienced by access terminal 402. By way of example, feedback evaluation component 410 can detect whether access terminal 402 is located nearby base station 404 or closer to an edge of a downlink coverage area associated with base station 404 from the received feedback.

Moreover, base station 404 can include a multicarrier scheduling component 412 that schedules downlink transmission to access terminal 402 (and disparate access terminal(s)) using a plurality of carriers. Multicarrier scheduling component 412 can schedule the downlink transmission as a function of the downlink channel conditions (e.g., interference levels, . . . ) received and/or analyzed by feedback evaluation component 410.

Multicarrier scheduling component 412 can further include a frequency reuse set assignment component 414 that allocates frequency reuse set(s) from the plurality of carriers for downlink transmission to access terminal 402. For example, frequency reuse set assignment component 414 can assign frequency reuse set(s) based upon an interference level experienced by access terminal 402 (e.g., as recognized by feedback evaluation component 410 from received feedback, . . . ). Moreover, frequency reuse set assignment component 414 can allot frequency reuse set(s) as a function of power class of base station 404.

According to an example, frequency reuse set assignment component 414 can allot at least one frequency reuse set from each carrier in a multicarrier heterogeneous wireless communication environment to access terminal 402 for downlink transmission. By way of another example, frequency reuse set assignment component 414 can allot at least one frequency reuse set from a subset of the carriers in a multicarrier heterogeneous wireless communication environment to access terminal 402 for downlink transmission. Following this example, frequency reuse set assignment component 414 need not allot a frequency reuse set from remaining carrier(s) not included in the subset to access terminal 402.

Each carrier in a multicarrier heterogeneous wireless communication environment can be divided into a plurality of frequency reuse sets. Thus, an overall bandwidth of a given carrier can be separated into a plurality of frequency reuse sets. Moreover, the frequency reuse sets from the given carrier can be non-overlapping in frequency within the overall bandwidth of the given carrier. It is contemplated that the division of the carriers into the frequency reuse sets can be predetermined, dynamically selected, and so forth. While many of the examples described herein relate to each carrier being divided into three frequency reuse sets, it is contemplated that the claimed subject matter is not so limited; rather, it is to be appreciated that each carrier can be split into any number of frequency reuse sets and/or different carriers can be divided into different numbers of frequency reuse sets.

Further, each frequency reuse set can be categorized as being one of an unrestricted reuse set (e.g., non-restricted reuse set, . . . ) or a restricted reuse set for each power class of base station. According to an example, a given frequency reuse set from a particular carrier can be categorized as an unrestricted reuse set for a pico cell base station and a restricted reuse set for a macro cell base station; however, it is to be appreciated that the claimed subject matter is not limited to the foregoing example. Moreover, within a given carrier, a number of unrestricted reuse sets versus a number of restricted reuse sets for a given power class of base station can be a function of a categorization of the given carrier as being a high power carrier (e.g., an unrestricted power carrier, . . . ) or a low power carrier.

Frequency reuse set assignment component 414 can leverage the frequency reuse set categorizations when assigning frequency reuse set(s) for downlink transmission to access terminal 402. For example, frequency reuse set assignment component 414 can allocate frequency reuse set(s) categorized for unrestricted reuse within a given carrier when base station 404 is a low power base station (e.g., pico cell base station, micro cell base station, femto cell base station, . . . ) and feedback evaluation component 410 recognizes that access terminal 402 experiences interference above a threshold on the given carrier (e.g., from a neighboring macro cell base station, . . . ). According to another example, frequency reuse set assignment component 414 can allot frequency reuse set(s) categorized for unrestricted reuse within a particular carrier when base station 404 is a macro cell base station and feedback evaluation component 410 identifies that access terminal 402 experiences interference above a threshold on the particular carrier (e.g., from a neighboring low power base station, . . . ). By way of a further example, frequency reuse set assignment component 414 can allocate frequency reuse set(s) categorized for both unrestricted reuse and restricted reuse within a given carrier when base station 404 is a low power base station and feedback evaluation component 410 recognizes that access terminal 402 experiences interference below a threshold on the given carrier (e.g., from a neighboring macro cell base station, . . . ). Pursuant to another example, frequency reuse set assignment component 414 can allot frequency reuse set(s) categorized for both unrestricted reuse and restricted reuse within a particular carrier when base station 404 is a macro cell base station and feedback evaluation component 410 identifies that access terminal 402 experiences interference below a threshold on the given carrier (e.g., from a neighboring low power base station, . . . ).

Moreover, base station 404 can include a power control component 416 and a transmission component 418. Power control component 416 can manage a power level at which a downlink transmission can be sent by base station 404 using transmission component 418. Further, transmission component 418 can transmit the downlink transmission to access terminal 402. Power control component 416 can manage the power level for transmission using resources of a frequency reuse set as a function of the frequency reuse set categorization (e.g., unrestricted reuse versus restricted reuse, . . . ) and/or the power class of base station 404. For example, when base station 404 is a low power base station, power control component 416 can manage transmission component 418 to send a downlink transmission at a full power level (e.g., full power level of the low power base station, . . . ) on resources of frequency reuse sets categorized for either unrestricted reuse or restricted reuse. According to another example, when base station 404 is a macro cell base station, power control component 416 can control transmission component 418 to send a downlink transmission at full power level (e.g., full power level of the high power base station, . . . ) on resources of frequency reuse sets categorized for unrestricted reuse. Moreover, following this example where base station 404 is a macro cell base station, power control component 416 can control transmission component 418 to send a downlink transmission at low power level (e.g., lower power level of the high power base station, . . . ) on resources of frequency reuse sets categorized for restricted reuse.

Figure 5:
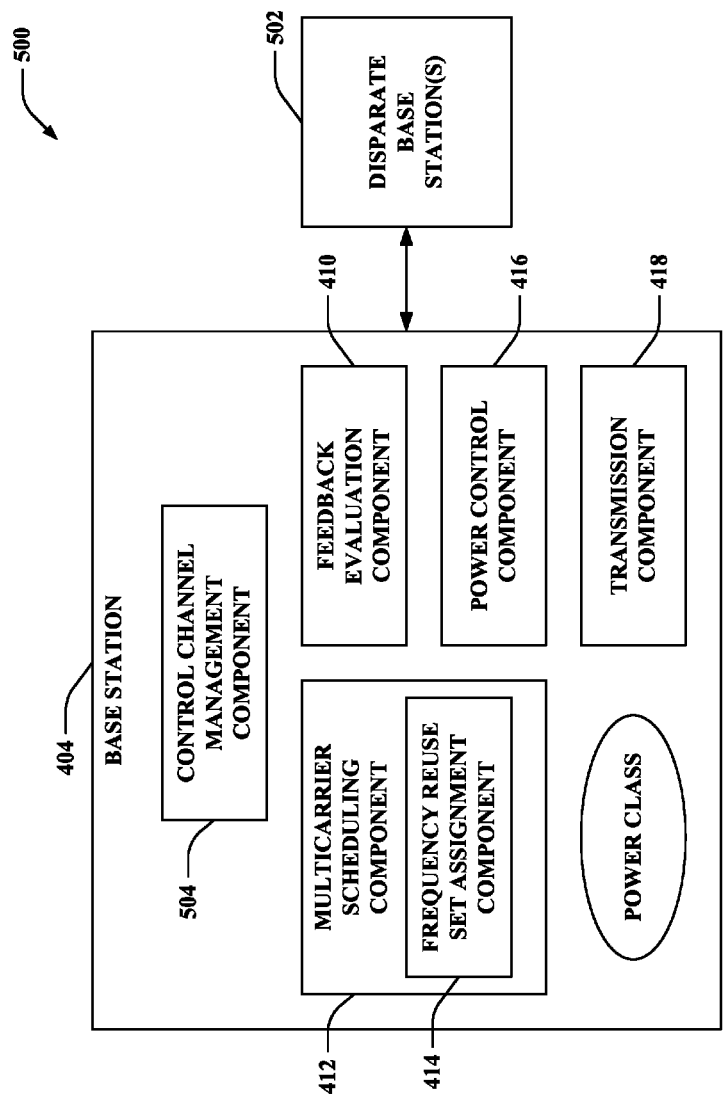
FIG. 5 is an illustration of an example system that mitigates jamming of control channel transmissions when utilizing fractional frequency reuse within carriers in a multicarrier heterogeneous wireless communication environment.

With reference to FIG. 5, illustrated is a system 500 that mitigates jamming of control channel transmissions when utilizing fractional frequency reuse within carriers in a multicarrier heterogeneous wireless communication environment. System 500 includes base station 404 and any number of disparate base station(s) 502. For example, base station 404 can be a macro cell base station, a pico cell base station, a femto cell base station, a micro cell base station, or the like. Moreover, disparate base station(s) 502 can include macro cell base station(s), pico cell base station(s), femto cell base station(s), micro cell base station(s), a combination thereof, and so forth. Although not depicted, it is to be appreciated that system 500 can include any number of access terminal(s) (e.g., access terminal 402 of FIG. 4, . . . ).

As described herein, base station 404 can include feedback evaluation component 410, multicarrier scheduling component 412 which can further comprise frequency reuse set assignment component 414, power control component 416, and transmission component 418. Moreover, base station 404 can include a control channel management component 504. Although not shown, it is contemplated that disparate base station(s) 502 can include similar components; however, the claimed subject matter is not so limited.

Base station 404 and disparate base station(s) 502 can each send control information over a downlink control channel. A downlink control channel such as, for instance, a Physical Downlink Control Channel (PDCCH), can include N orthogonal frequency division multiplexing (OFDM) symbols in a sub-frame, where N can equal one, two, or three (e.g., first one, two or three OFDM symbols in a sub-frame, . . . ). Further, the downlink control channel can span an entire frequency bandwidth of a carrier. A Physical Control Format Indicator Channel (PCFICH) can signal the value of N to indicate whether the PDCCH control region occupies the first one, two, or three OFDM symbols.

According to an example, base station 404 can be a macro cell base station and one or more of disparate base station(s) 502 can be pico cell base station(s) (e.g., pico cell base station(s) can be nearby macro cell base station 404, within coverage of macro cell base station 404, . . . ). Following this example, control channel management component 504 can inhibit base station 404 (e.g., macro cell base station 404, . . . ) from transmitting during a first M OFDM symbols in a sub-frame on a low power carrier, where M can equal one, two, or three. Impeding transmission by base station 404 (e.g., macro cell base station 404, . . . ) during the first M OFDM symbols can enable the pico cell base station(s) (e.g., the one or more disparate base station(s) 502, . . . ) to transmit respective control channel(s) utilizing the first M OFDM symbols across the frequency bandwidth of the low power carrier without jamming by base station 404.

Following the above example, by way of an illustration, control channel management component 504 can select a maximum value for M regardless of the number of OFDM symbols actually utilized by the pico cell base station(s). Thus, control channel management component 504 can inhibit macro cell base station 404 from sending a downlink transmission during a first three OFDM symbols of a sub-frame on the low power carrier regardless of the number of OFDM symbols respectively employed by the pico cell base station(s) for corresponding control channel(s). According to another illustration, control channel management component 504 can collect information concerning the number of OFDM symbols utilized by each of the pico cell base station(s) during each transmission time interval (TTI), and a maximum number of OFDM symbols indicated in the collected information can be identified as the value for M. Control channel management component 504 can thus inhibit macro cell base station 404 from sending a downlink transmission during a first M OFDM symbols of a sub-frame as identified on the low power carrier. Moreover, following this illustration, the value of M can be reevaluated over time; however, the claimed subject matter is not so limited.

According to another example, base station 404 can be a pico cell base station. Hence, control channel management component 504 can indicate a number of OFDM symbols in a sub-frame utilized for a downlink control channel (e.g., by signaling via PCFICH, . . . ). Moreover, while neighboring macro cell base station(s) can inhibit transmission during the first M OFDM symbols in a sub-frame on a low power carrier, pico cell base station 404 can send control channel transmissions employing the first M OFDM symbols in the sub-frame on the low power carrier without being jammed by the neighboring macro cell base station(s).

As set forth above, frequency reuse schemes within a carrier can be employed in addition to carrier partitioning (e.g., as described in FIG. 2, . . . ). The frequency reuse schemes can be more dynamic than carrier partitioning. Since the frequency reuse schemes can impact reliable reception of common reference signals (CRSs) and the control region when used together with the Release 8 waveform, operation in part of the carrier band can be leveraged by Long Term Evolution-Advanced (LTE-A) access terminals.

As noted herein, a carrier bandwidth can be divided into several frequency reuse sets. Access terminals in different channel conditions can have different frequency reuse as they can belong to different reuse sets. In a dynamic fractional frequency reuse scheme, access terminals can potentially be scheduled (e.g., by multicarrier scheduling component 412, by frequency reuse set assignment component 414, . . . ) on a packet-by-packet basis. Allocation of a frequency reuse set by frequency reuse set assignment component 414 can be based on channel desirability as each access terminal experiences different channel desirability (e.g., in terms of long-term interference as recognized by feedback evaluation component 410, . . . ) on each frequency reuse set.

Application of fractional frequency reuse to base stations (e.g., cells, . . . ) in heterogeneous networks can allow for a shared carrier to be efficiently utilized (e.g., with full power on unrestricted reuse sets, . . . ) with finer frequency resource partitioning. Such fractional frequency reuse can also be adapted faster than conventional carrier partitioning as the bandwidth occupied by a base station need not be changed.

Figure 6:
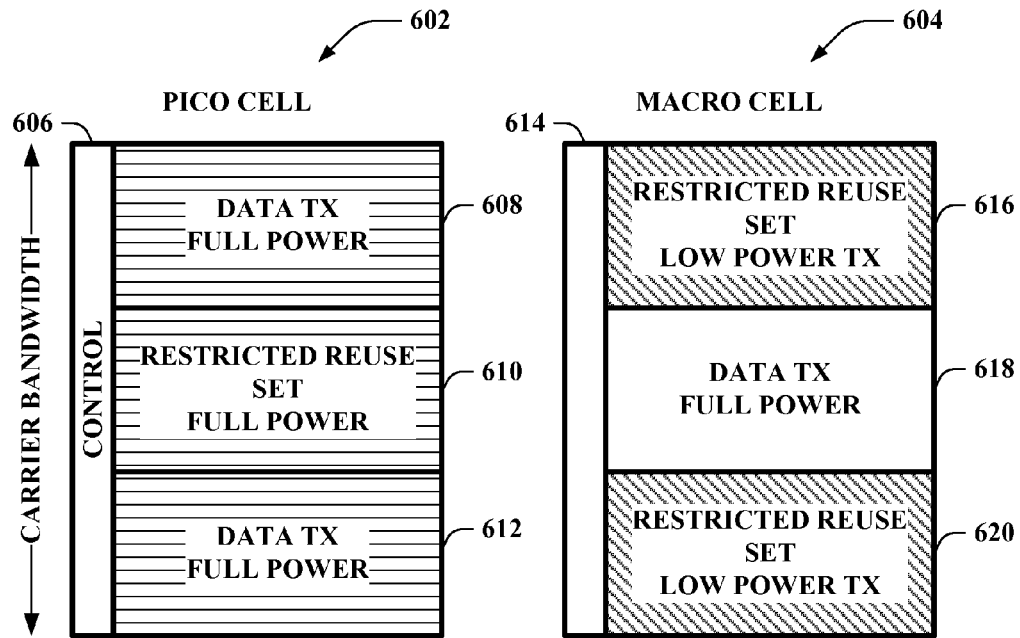
FIGS. 6 and 7 are illustrations of example fractional frequency reuse set configurations for shared carriers in a multicarrier heterogeneous wireless communication environment.
Figure 7:
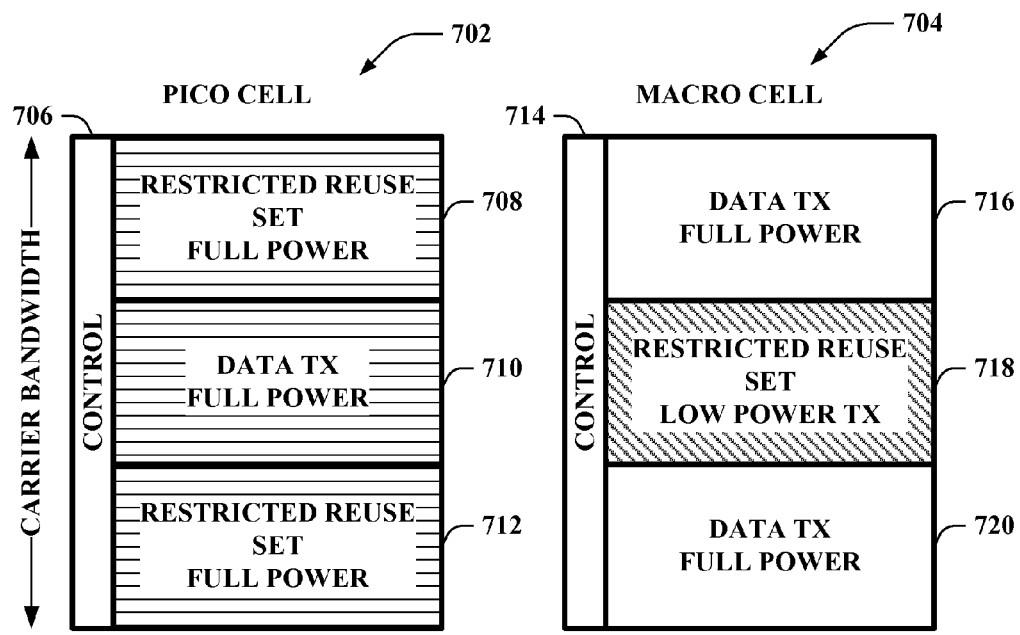

Turning to FIGS. 6-7, illustrated are example fractional frequency reuse set configurations for shared carriers in a multicarrier heterogeneous wireless communication environment. The depicted examples show a carrier bandwidth being divided into three frequency reuse sets; however, it is to be appreciated that a carrier bandwidth can be split into any disparate number of frequency reuse sets. Further, each of the frequency reuse sets can be categorized as being for restricted reuse (e.g., restricted reuse set, . . . ) or unrestricted reuse (e.g., data transmission (TX), . . . ) and assigned a power level for transmission (e.g., full power, low power transmission (TX), . . . ). It is to be appreciated that these configurations are shown for illustration purposes, and the claimed subject matter is not so limited.

Referring to FIG. 6, illustrated are example fractional frequency reuse set configurations 602 and 604 for a shared carrier with low power. Fractional frequency reuse set configuration 602 can be utilized by a pico cell base station and fractional frequency reuse set configuration 604 can be utilized by a macro cell base station.

Fractional frequency reuse set configuration 602 for a pico cell base station includes a control region 606 that spans an entire frequency bandwidth of the shared carrier with low power. Further, control region 606 can occupy a first one, two, or three OFDM symbols of a sub-frame. Moreover, carrier bandwidth for remaining symbols (e.g., other than symbol(s) included in the frequency strip associated with control region 606, . . . ) can be divided into frequency reuse sets. In particular, for the illustrated example, the frequency reuse sets can include an unrestricted reuse set 608 (e.g., data transmission (TX), . . . ), a restricted reuse set 610, and an unrestricted reuse set 612 (e.g., data TX, . . . ). As depicted, a pico cell base station can send a transmission at full power utilizing any of reuse sets 608-612; however, the claimed subject matter is not so limited.

Fractional frequency reuse set configuration 604 for a macro cell base station can include a reserved region 614 that spans an entire frequency bandwidth of the shared carrier with low power. A macro cell base station can be inhibited from transmitting utilizing resources included in reserved region 614. Moreover, reserved region 614 can occupy a first one, two, or three OFDM symbols of a sub-frame. Reserved region 614 can be leveraged to mitigate jamming caused by a macro cell base station to a pico cell base station. Further, carrier bandwidth for remaining symbols (e.g., other than symbol(s) included in the frequency strip associated with reserved region 614, . . . ) can be split into frequency reuse sets; namely, a restricted reuse set 616, an unrestricted reuse set 618 (e.g., data TX, . . . ), and a restricted reuse set 620. A macro cell base station can send a transmission at full power upon resources associated with unrestricted reuse set 618. Moreover, a macro cell base station can send a transmission at a lower power upon resources associated with restricted reuse sets 616 and 620.

Within fractional frequency reuse set configuration 604 for the macro cell base station, unrestricted reuse set 618 (e.g., data TX, . . . ) on the shared carrier with low power can be leveraged by the macro cell base station to serve access terminal(s) on such resources. The resources of unrestricted reuse set 618 can be employed by the macro cell base station to send downlink transmissions to its access terminal(s) positioned at any location(s) within a downlink coverage area of the macro cell base station. Moreover, resources of restricted reuse sets 616 and 620 on the shared carrier with low power can be utilized by the macro cell base station to serve access terminal(s) located within close proximity to the macro cell base station.

In order to mitigate interference caused by the macro cell base station to unrestricted reuse sets 608 and 612 of the pico cell base station on the shared carrier with low power, common reference signal (CRS) configuration that differs from the Release 8 specification can be utilized (e.g., possibly with low power on restricted reuse sets 616 and 620 and with high power on non-restricted reuse set 618 for the macro cell base station, . . . ). To improve receiver performance, dedicated reference signals (RSs) can be transmitted on non-restricted reuse set 618 for the macro cell base station. Also, to prevent jamming of control region 606 (e.g., PDCCH region, . . . ) of the pico cell base station on such carrier, macro cell base station(s) and pico cell base station(s) are time synchronized with respect to each other, and the macro cell base station can inhibit transmission on those resources (e.g., associated with reserved region 614, . . . ). According to another illustration, the macro cell base station can use low transmit power on the resources of reserved region 614; yet, the claimed subject matter is not so limited. Alternatively, in case of an asynchronous deployment, non-restricted reuse set 618 of the macro cell base station typically could interfere with a portion of control region 606 of fractional frequency reuse set configuration 602 for the pico cell base station where overlap occurs.

The aforementioned description can imply that a non-backward compatible configuration on frequency reuse sets of a macro cell base station on shared carriers with low power can be utilized. Hence, LTE-A access terminals can be scheduled on such resources.

Referring to FIG. 7, illustrated are example fractional frequency reuse set configurations 702 and 704 for a shared carrier with unrestricted power. Fractional frequency reuse set configuration 702 can be utilized by a pico cell base station and fractional frequency reuse set configuration 704 can be utilized by a macro cell base station.

Fractional frequency reuse set configuration 702 for a pico cell base station includes a control region 706 that spans an entire frequency bandwidth of the shared carrier with unrestricted power. Further, control region 706 can occupy a first one, two, or three OFDM symbols of a sub-frame. Moreover, carrier bandwidth for remaining symbols (e.g., other than symbol(s) included in the frequency strip associated with control region 706, . . . ) can be divided into frequency reuse sets. In particular, for the illustrated example, the frequency reuse sets can include a restricted reuse set 708, an unrestricted reuse set 710 (e.g., data TX, . . . ), and a restricted reuse set 712. As depicted, a pico cell base station can send a transmission at full power utilizing any of reuse sets 708-712; however, the claimed subject matter is not so limited.

Fractional frequency reuse set configuration 704 for a macro cell base station can include a control region 714 that spans an entire frequency bandwidth of the shared carrier with unrestricted power. Control region 714 can occupy a first one, two, or three OFDM symbols of a sub-frame. Further, carrier bandwidth for remaining symbols (e.g., other than symbol(s) included in the frequency strip associated with control region 714, . . . ) can be split into frequency reuse sets; namely, an unrestricted reuse set 716 (e.g., data TX, . . . ), a restricted reuse set 718, and an unrestricted reuse set 720 (e.g., data TX, . . . ). A macro cell base station can send a transmission at full power upon resources associated with unrestricted reuse sets 716 and 720. Moreover, a macro cell base station can send a transmission at a lower power upon resources associated with restricted reuse set 718.

Macro cell restricted reuse set 718 on a shared carrier with unrestricted power can provide for range expansion on those resources in pico cells (e.g., corresponding to unrestricted reuse set 710, . . . ). Macro cell restricted reuse set 718 can be used for transmission with low power, which can mitigate interference with other cells. Hence, resources from macro cell restricted reuse set 718 can be used for access terminal(s) served by a macro cell base station in very good channel conditions (e.g., positioned within close proximity of the macro cell base station, . . . ).

Pico cell range expansion access terminals on a shared carrier with unrestricted power can experience control channel problems on regions that are interfered by macro cell unrestricted reuse sets 716 and 720 (e.g., transmission at high power, . . . ). Hence, control channel for pico cell range expansion access terminals on such carriers can be placed within unrestricted reuse set 710. Also, macro cell CRS high interference due to high transmitted power can be notched out by access terminals with range expansion served by a pico cell base station. RSs provided by a pico cell base station on non-restricted reuse set 710 can be provided to not coincide with the CRS from a macro cell base station, which can be achievable in a synchronous deployment. Therefore, to allow range expansion on pico cell non-restricted resources on a shared carrier with unrestricted power, non-backward compatible pico configuration on those resources can be leveraged.

Figure 8:
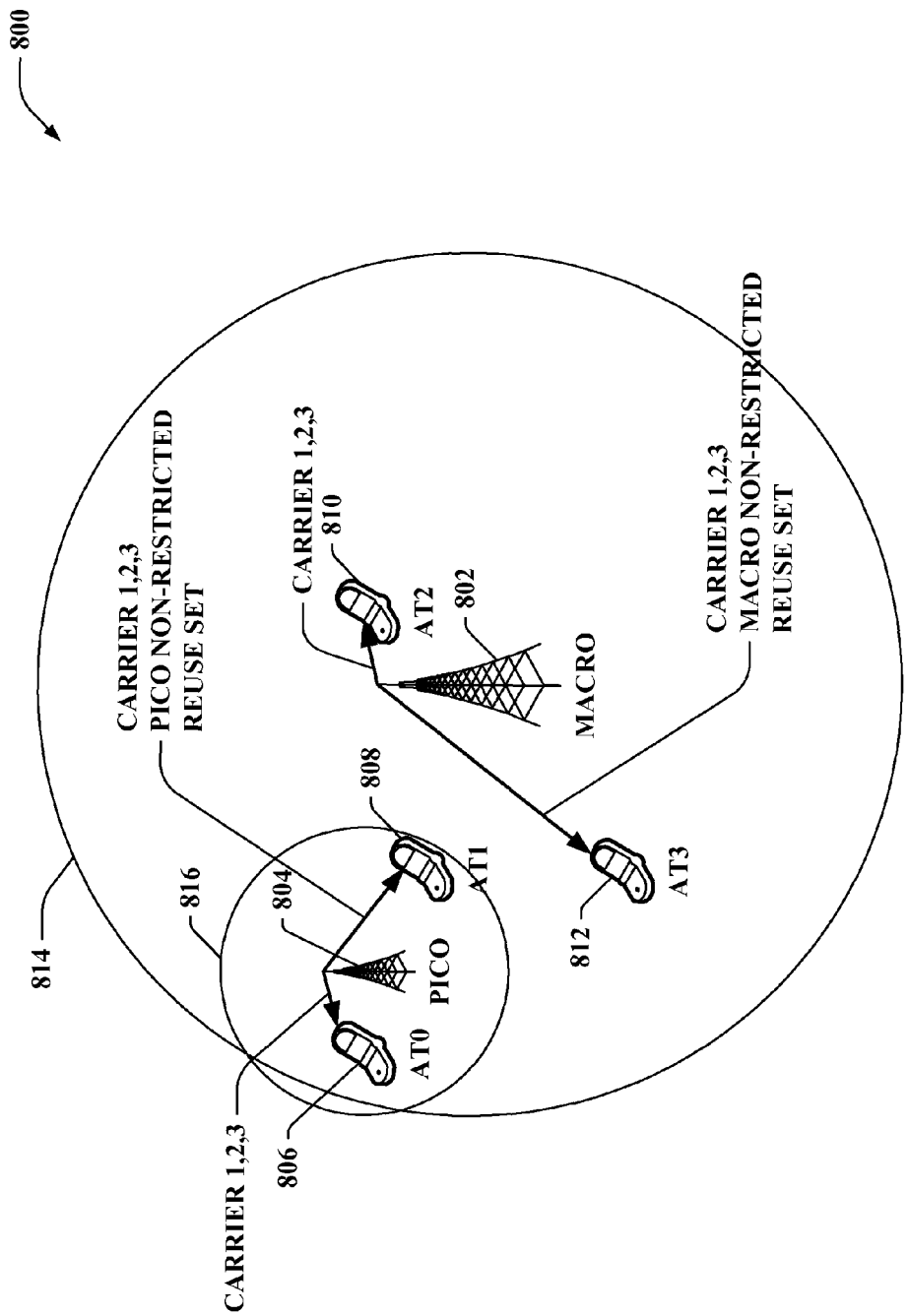
FIG. 8 is an illustration of an example system that utilizes fractional frequency reuse within carriers in a multicarrier heterogeneous wireless communication environment.

With reference to FIG. 8, illustrated is an example system 800 that utilizes fractional frequency reuse within carriers in a multicarrier heterogeneous wireless communication environment. Similar to FIG. 3, system 800 can include a macro cell base station 802, a pico cell base station 804, and a plurality of access terminals (e.g., access terminal 0 806, access terminal 1 808, access terminal 2 810, and access terminal 3 812, . . . ). Moreover, macro cell base station 802 can be associated with a downlink coverage area 814 and pico cell base station 804 can be associated with a downlink coverage area 816.

System 800 can utilize three carriers: carrier 1 and carrier 3 can be shared carriers with unrestricted power and carrier 2 can be a shared carrier with low power. Macro cell base station 802 and pico cell base station 804 can employ respective fractional frequency reuse set configurations 702 and 704 from FIG. 7 for carriers 1 and 3, and can utilize respective fractional frequency reuse set configurations 602 and 604 from FIG. 6 for carrier 2. In contrast, for the example depicted in FIG. 3, macro cell base station 302 and pico cell base station 304 can use entire bandwidths of the three carriers, and can transmit at full power of the power class they respectively belong to on non-restricted reuse sets that span across carrier bandwidths.

Use of restricted reuse sets for macro cell base station 802 on carrier 2 can allow for range expansion on pico cell base station 804 on those resources. According to the depicted example, access terminal 0 806 and access terminal 1 808 can be served by pico cell base station 804, and access terminal 2 810 and access terminal 3 812 can be served by macro cell base station 802. Access terminal 0 806 can be served by pico cell base station 804 with full pico (e.g., low, . . . ) power on resources of the three carriers since access terminal 0 806 is located within close proximity to pico cell base station 804. Further, access terminal 1 808 can be served by pico cell base station 804 on non-restricted reuse sets for pico cell base station 804 on carriers 1, 2, and 3. Thus, a scheduler of pico cell base station 804 can be aware of restricted reuse set resource blocks (RBs) and can skip scheduling range expansion access terminals such as access terminal 1 808 on such resources. Moreover, access terminal 2 810 can be served by macro cell base station 802 on the three carriers, but with low power on restricted reuse sets and full macro (e.g., high, . . . ) power on non-restricted reuse sets. Further, access terminal 3 812 can be served by macro cell base station 802 on non-restricted reuse sets for macro cell base station 802 on carriers 1, 2, and 3.

Figure 9:
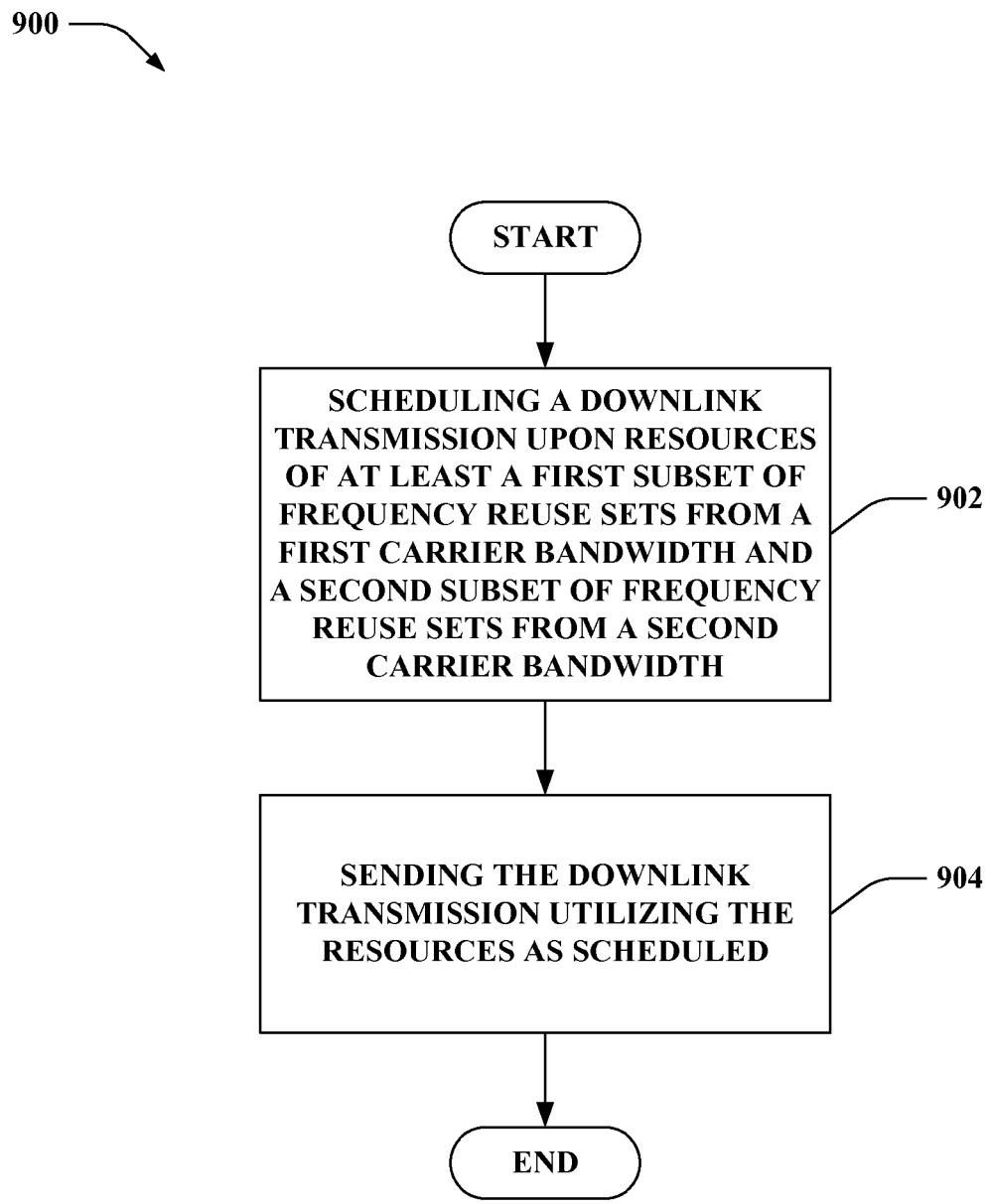
FIG. 9 is an illustration of an example methodology that facilitates reusing carriers in a multicarrier heterogeneous wireless communication environment.
Figure 10:
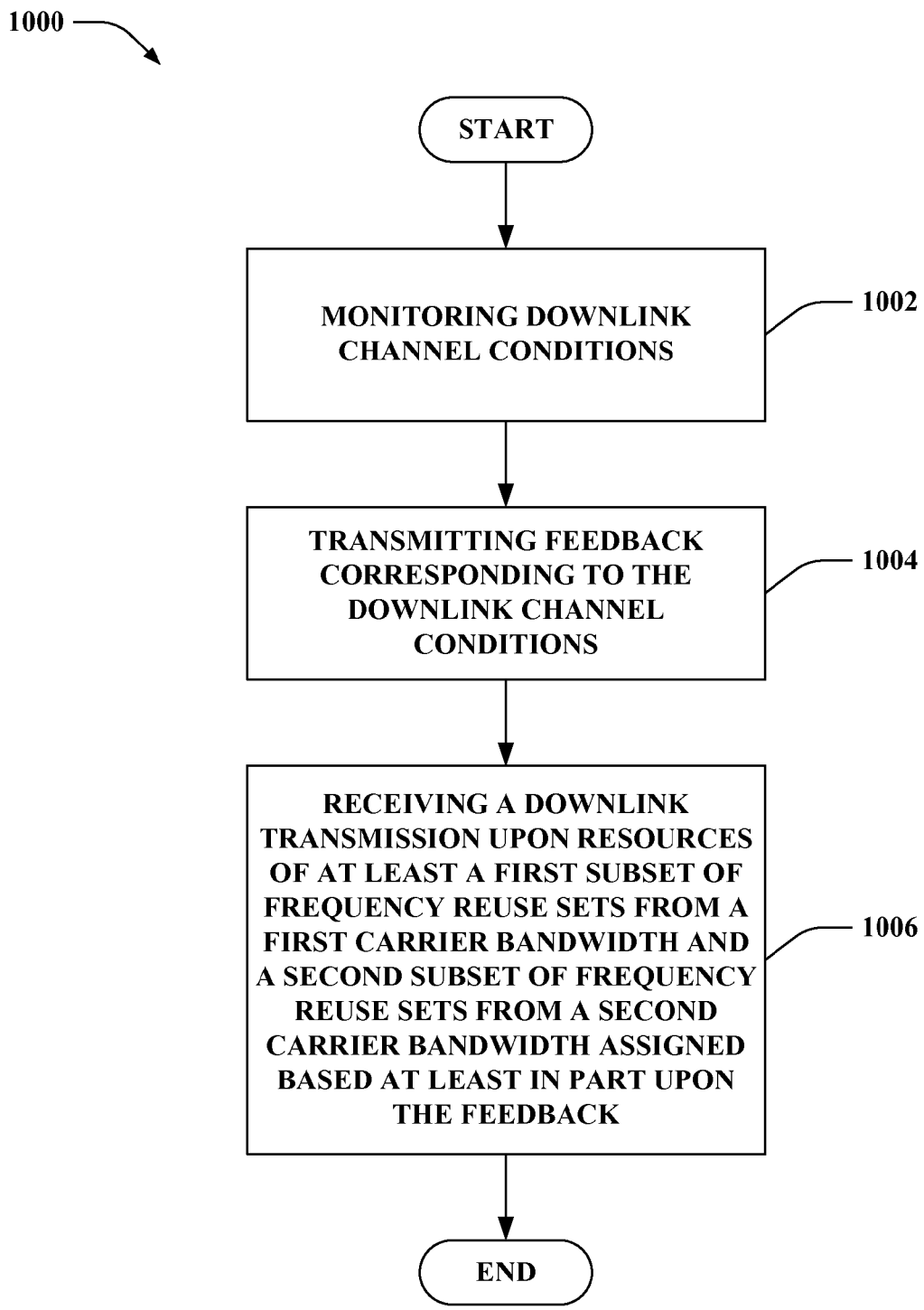
FIG. 10 is an illustration of an example methodology that facilitates obtaining a downlink transmission in a multicarrier heterogeneous wireless communication environment.

Referring to FIGS. 9-10, methodologies relating to utilizing fractional frequency reuse within multiple carriers in a multicarrier heterogeneous wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 9, illustrated is a methodology 900 that facilitates reusing carriers in a multicarrier heterogeneous wireless communication environment. At 902, a downlink transmission can be scheduled upon resources of at least a first subset of frequency reuse sets from a first carrier bandwidth and a second subset of frequency reuse sets from a second carrier bandwidth. For instance, the downlink transmission can be scheduled upon the resources of at least the first subset of the frequency reuse sets from the first carrier bandwidth and the second subset of the frequency reuse sets from the second carrier bandwidth based upon one or more of a power class of a base station, categorizations of the frequency reuse sets from the first carrier bandwidth and the second carrier bandwidth, and/or an interference level experienced by an access terminal. According to an example, the base station can be a high power base station (e.g., macro cell base station, . . . ) or a low power base station (e.g., pico cell base station, femto cell base station, micro cell base station, . . . ). Pursuant to another example, each of the frequency reuse sets of a base station can be categorized as being for one of unrestricted reuse or restricted reuse; it is contemplated that each of the frequency reuse sets of the base station can be categorized differently as compared to a different base station. Following this example, the first carrier bandwidth can be divided into a plurality of frequency reuse sets and the second carrier bandwidth can be divided into a plurality of frequency reuse sets. For instance, the plurality of frequency reuse sets from a given carrier bandwidth can be non-overlapping in frequency. Moreover, based upon the power class of the base station, each of the frequency reuse sets from the first carrier bandwidth can be categorized as being for one of unrestricted reuse or restricted reuse and each of the frequency reuse sets from the second carrier bandwidth can be categorized as being for one of unrestricted reuse or restricted reuse. Further, each of the frequency reuse sets can be categorized as being for one of unrestricted reuse or restricted reuse as a function of carrier power level (e.g., shared carrier with low power, shared carrier with unrestricted power, . . . ). For instance, employing fractional frequency reuse on a shared carrier with low power can enable extending a range for access terminals served by a high power base station, while utilizing fractional frequency reuse on a shared carrier with unrestricted power can enable extending a range for access terminals served by a low power base station. By way of another example, the interference level experienced by the access terminal can be identified based upon received feedback (e.g., obtained from the access terminal, . . . ). At 904, the downlink transmission can be sent utilizing the resources as scheduled.

According to an example, the first subset of the frequency reuse sets from the first carrier bandwidth and the second subset of the frequency reuse sets from the second carrier bandwidth can include unrestricted reuse sets when the base station is a low power base station and the access terminal experiences interference on restricted reuse sets from the first carrier bandwidth and the second carrier bandwidth above a threshold. Thus, the downlink transmission can be sent at a full power level of the low power base station on the resources of the unrestricted reuse sets from the first carrier bandwidth and the second carrier bandwidth.

By way of another example, the first subset of the frequency reuse sets from the first carrier bandwidth and the second subset of the frequency reuse sets from the second carrier bandwidth can include unrestricted reuse sets when the base station is a high power base station and the access terminal experiences interference on restricted reuse sets from the first carrier bandwidth and the second carrier bandwidth above a threshold. Hence, the downlink transmission can be sent at a full power level of the high power base station on the resources of the unrestricted reuse sets from the first carrier bandwidth and the second carrier bandwidth.

Pursuant to a further example, the first subset of the frequency reuse sets from the first carrier bandwidth and the second subset of the frequency reuse sets from the second carrier bandwidth can include unrestricted reuse sets and restricted reuse sets when the base station is a low power base station and the access terminal experiences interference on the restricted reuse sets from the first carrier bandwidth and the second carrier bandwidth below a threshold. Following this example, the downlink transmission can be sent at a full power level of the low power base station on the resources of the unrestricted reuse sets and the restricted reuse sets from the first carrier bandwidth and the second carrier bandwidth.

According to yet another example, the first subset of the frequency reuse sets from the first carrier bandwidth and the second subset of the frequency reuse sets from the second carrier bandwidth can include unrestricted reuse sets and restricted reuse sets when the base station is a high power base station and the access terminal experiences interference on the restricted reuse sets from the first carrier bandwidth and the second carrier bandwidth below a threshold. Thus, the downlink transmission can be sent at a full power level of the high power base station on the resources of the unrestricted reuse sets from the first carrier bandwidth and the second carrier bandwidth, and the downlink transmission can be sent at a lower power level of the high power base station on the resources of the restricted reuse sets from the first carrier bandwidth and the second carrier bandwidth.

Moreover, a first M orthogonal frequency division multiplexing (OFDM) symbols in a sub-frame spanning the first carrier bandwidth and the second carrier bandwidth can be one of reserved or utilized for transmitting control information over a downlink control channel (e.g., Physical Downlink Control Channel (PDCCH), . . . ), where M can be an integer equal to one, two, or three. A value of M can be predefined (e.g., set to a maximum value, set to 3, . . . ), determined based upon indications received from neighboring base station(s) (e.g., signaled via a Physical Control Format Indicator Channel (PCFICH), . . . ), or the like. For instance, for a shared carrier with low power, the first M OFDM symbols can be reserved for a high power base station such that the high power base station is inhibited from sending a transmission utilizing the first M OFDM symbols across a bandwidth of the shared carrier with low power. By way of another example, the first M OFDM symbols can be utilized for transmitting control information over the downlink control channel for a low power base station operating upon either a shared carrier with low power or a shared carrier with unrestricted power. Pursuant to a further example, the first M OFDM symbols can be employed for transmitting control information over the downlink control channel for a high power base station operating upon a shared carrier with unrestricted power. In accordance with yet another example, a control channel for a low power base station on a shared channel with unrestricted power can be placed within unrestricted reuse sets of the low power base station.

According to a further example, a reference signal can be configured as a function of carrier power level (e.g., shared carrier with low power, shared carrier with unrestricted power, . . . ), power class of a base station, and categorizations of the frequency reuse sets from at least one of the first carrier bandwidth or the second carrier bandwidth. The reference signal, for instance, can be configured by selecting at least one of resources used for the reference signal or power level used for the reference signal. By way of illustration, the reference signal can be configured to use low power on restricted reuse sets or high power on unrestricted reuse sets on a shared carrier with low power for a macro cell base station.

Now turning to FIG. 10, illustrated is a methodology 1000 that facilitates obtaining a downlink transmission in a multi-carrier heterogeneous wireless communication environment.

At 1002, downlink channel conditions can be monitored. For instance, downlink signal strengths and/or interference levels can be measured. According to an example, the measured downlink signal strengths and/or interference levels can be compared to respective thresholds. By way of a further example, downlink channel conditions can be monitored for each downlink channel, for each frequency reuse set, or the like. At 1004, feedback corresponding to the downlink channel conditions can be transmitted.

At 1006, a downlink transmission can be received upon resources of at least a first subset of frequency reuse sets from a first carrier bandwidth and a second subset of frequency reuse sets from a second carrier bandwidth assigned based at least in part upon the feedback. Further, the resources of the at least the first subset of the frequency reuse sets from the first carrier bandwidth and the second subset of the frequency reuse sets from the second carrier bandwidth can be assigned as a function of one or more of a power class of a base station from which the downlink transmission is received and/or categorizations of the frequency reuse sets from the first carrier bandwidth and the second carrier bandwidth. According to an example, the base station can be a high power base station (e.g., macro cell base station, . . . ) or a low power base station (e.g., pico cell base station, femto cell base station, micro cell base station, . . . ).

Pursuant to another example, each of the frequency reuse sets can be categorized as being for one of unrestricted reuse or restricted reuse. Following this example, the first carrier bandwidth can be divided into a plurality of frequency reuse sets and the second carrier bandwidth can be divided into a plurality of frequency reuse sets. For instance, the plurality of frequency reuse sets from a given carrier bandwidth can be non-overlapping in frequency. Moreover, based upon the power class of the base station, each of the frequency reuse sets from the first carrier bandwidth can be categorized as being for one of unrestricted reuse or restricted reuse and each of the frequency reuse sets from the second carrier bandwidth can be categorized as being for one of unrestricted reuse or restricted reuse. Further, each of the frequency reuse sets can be categorized as being for one of unrestricted reuse or restricted reuse as a function of carrier power level (e.g., shared carrier with low power, shared carrier with unrestricted power, . . . ).

According to an example, the first subset of the frequency reuse sets from the first carrier bandwidth and the second subset of the frequency reuse sets from the second carrier bandwidth can include unrestricted reuse sets when the base station is a low power base station and the downlink channel conditions on restricted reuse sets from the first carrier bandwidth and the second carrier bandwidth are above a threshold. By way of another example, the first subset of the frequency reuse sets from the first carrier bandwidth and the second subset of the frequency reuse sets from the second carrier bandwidth can include unrestricted reuse sets when the base station is a high power base station and the downlink channel conditions on restricted reuse sets from the first carrier bandwidth and the second carrier bandwidth are above a threshold. Pursuant to a further example, the first subset of the frequency reuse sets from the first carrier bandwidth and the second subset of the frequency reuse sets from the second carrier bandwidth can include unrestricted reuse sets and restricted reuse sets when the base station is a low power base station and the downlink channel conditions on the restricted reuse sets from the first carrier bandwidth and the second carrier bandwidth are below a threshold. According to yet another example, the first subset of the frequency reuse sets from the first carrier bandwidth and the second subset of the frequency reuse sets from the second carrier bandwidth can include unrestricted reuse sets and restricted reuse sets when the base station is a high power base station and the downlink channel conditions on the restricted reuse sets from the first carrier bandwidth and the second carrier bandwidth are below a threshold.

It will be appreciated that, in accordance with one or more aspects described herein, inferences can be made regarding utilizing fractional frequency reuse within carriers in a multicarrier heterogeneous wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
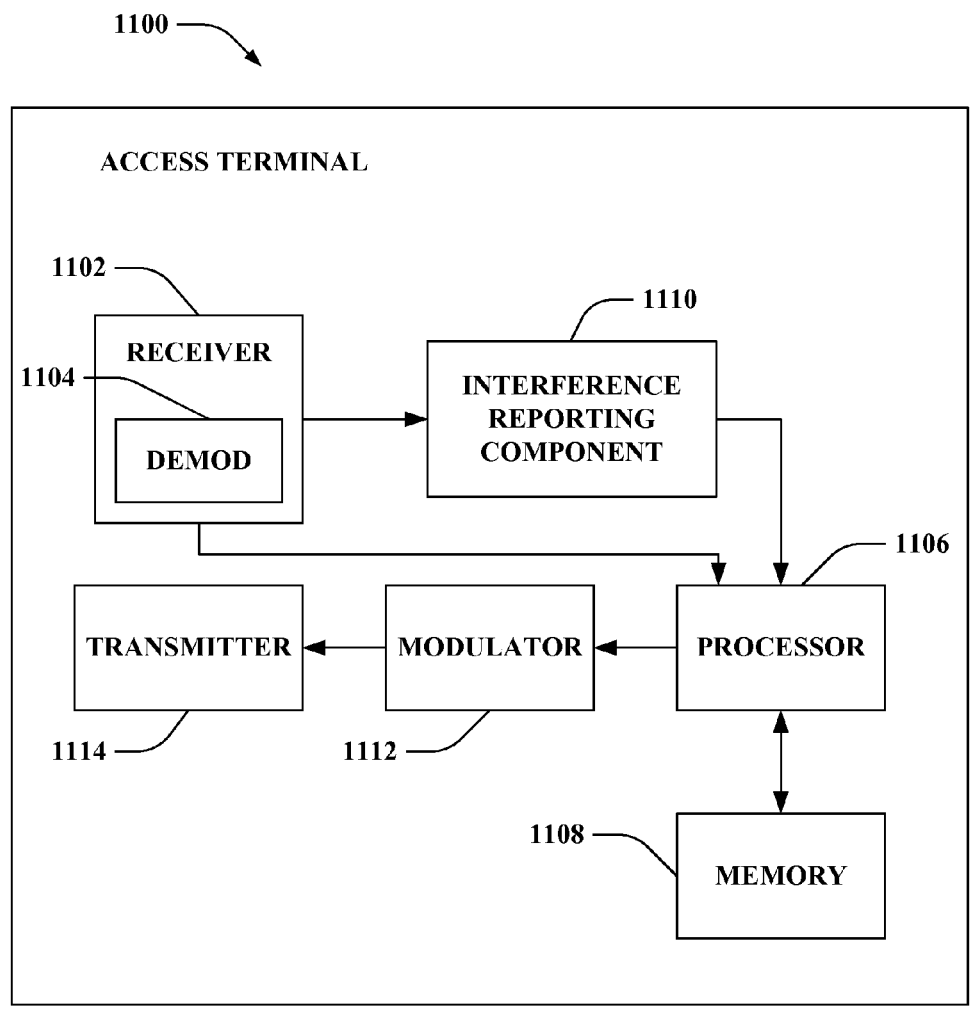
FIG. 11 is an illustration of an example access terminal that operates within a multicarrier heterogeneous wireless communication system.

FIG. 11 is an illustration of an access terminal 1100 that operates within a multicarrier heterogeneous wireless communication system. Access terminal 1100 comprises a receiver 1102 (e.g., substantially similar to reception component 408 of FIG. 4, . . . ) that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1114, a processor that controls one or more components of access terminal 1100, and/or a processor that both analyzes information received by receiver 1102, generates information for transmission by transmitter 1114, and controls one or more components of access terminal 1100.

Access terminal 1100 can additionally comprise memory 1108 that is operatively coupled to processor 1106 and that can store data to be transmitted, received data, and any other suitable information related to performing the various actions and functions set forth herein. Memory 1108, for instance, can store protocols and/or algorithms associated with monitoring downlink channel conditions, reporting feedback related to downlink channel conditions, and the like.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1106 can be operatively coupled to an interference reporting component 1110. Interference reporting component 1110 can be substantially similar to interference reporting component 406 of FIG. 4. Interference reporting component 1110 can monitor downlink channel conditions. Moreover, interference reporting component 1110 can yield feedback corresponding to the downlink channel conditions. Based at least in part upon the feedback, access terminal 1100 (e.g., receiver 1102, . . . ) can receive a downlink transmission upon resources of at least a first subset of frequency reuse sets from a first carrier bandwidth and a second subset of frequency reuse sets from a second carrier bandwidth. Access terminal 1100 still further comprises a modulator 1112 and a transmitter 1114 that transmits data, signals, etc. to a base station. Although depicted as being separate from the processor 1106, it is to be appreciated that interference reporting component 1110 and/or modulator 1112 can be part of processor 1106 or a number of processors (not shown).

Figure 12:
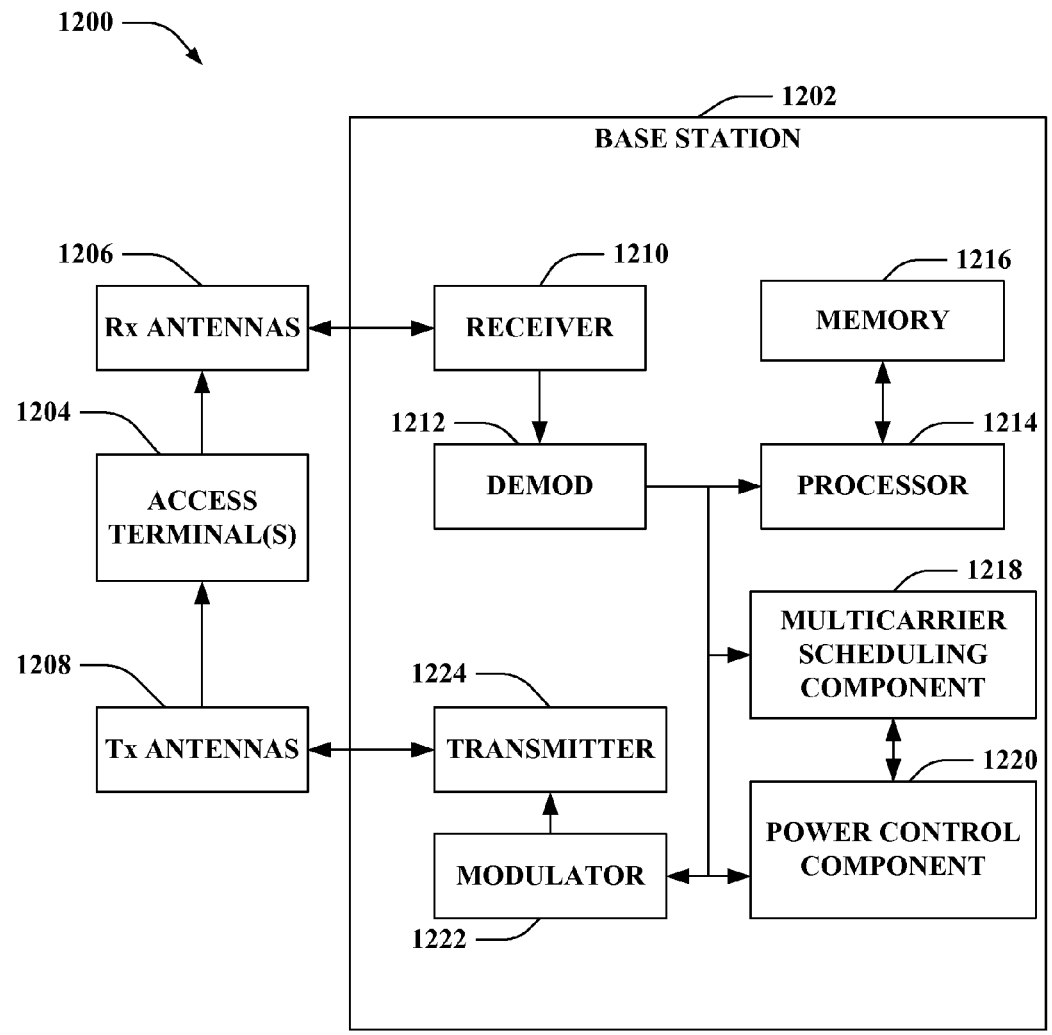
FIG. 12 is an illustration of an example system that leverages fractional frequency reuse in a multicarrier heterogeneous wireless communication environment.

FIG. 12 is an illustration of a system 1200 that leverages fractional frequency reuse in a multicarrier heterogeneous wireless communication environment. System 1200 comprises a base station 1202 (e.g., access point, . . . ) with a receiver 1210 that receives signal(s) from one or more access terminals 1204 through a plurality of receive antennas 1206, and a transmitter 1224 (e.g., substantially similar to transmission component 418 of FIG. 4, . . . ) that transmits to the one or more access terminals 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from access terminal(s) 1204 and/or any other suitable information related to performing the various actions and functions set forth herein. Processor 1214 is further coupled to a multicarrier scheduling component 1218 and/or a power control component 1220. Multicarrier scheduling component 1218 can be substantially similar to multicarrier scheduling component 412 of FIG. 4 and/or power control component 1220 can be substantially similar to power control component 416 of FIG. 4. Multicarrier scheduling component 1218 can schedule downlink transmission(s) to access terminal(s) 1204 using a plurality of carriers. The downlink transmission(s) can be scheduled upon one or more frequency reuse sets from the plurality of carriers. Further, power control component 1220 can manage power level(s) at which the downlink transmission(s) are sent. Moreover, although not shown, it is contemplated that base station 1202 can further include a frequency reuse set assignment component (e.g., substantially similar to frequency reuse set assignment component 414 of FIG. 4, . . . ), a feedback evaluation component (e.g., substantially similar to feedback evaluation component 410 of FIG. 4, . . . ), and/or a control channel management component (e.g., substantially similar to control channel management component 504 of FIG. 5, . . . ). Base station 1202 can further include a modulator 1222. Modulator 1222 can multiplex a frame for transmission by a transmitter 1224 through antennas 1208 to access terminal(s) 1204 in accordance with the aforementioned description. Although depicted as being separate from the processor 1214, it is to be appreciated that multicarrier scheduling component 1218, power control component 1220, and/or modulator 1222 can be part of processor 1214 or a number of processors (not shown).

Figure 13:
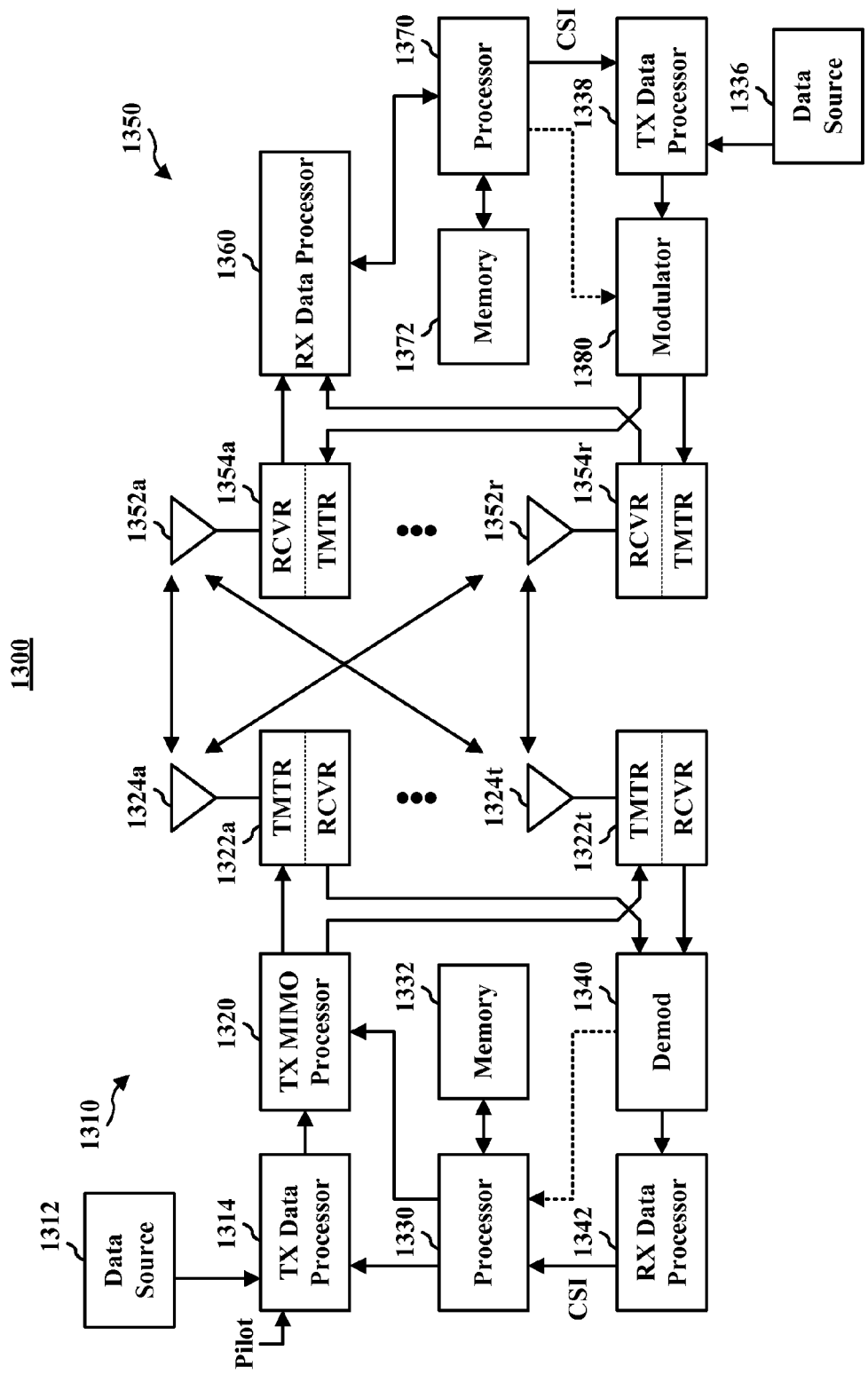
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-5, 8, 11-12, and 14-15) and/or methods (FIGS. 9-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
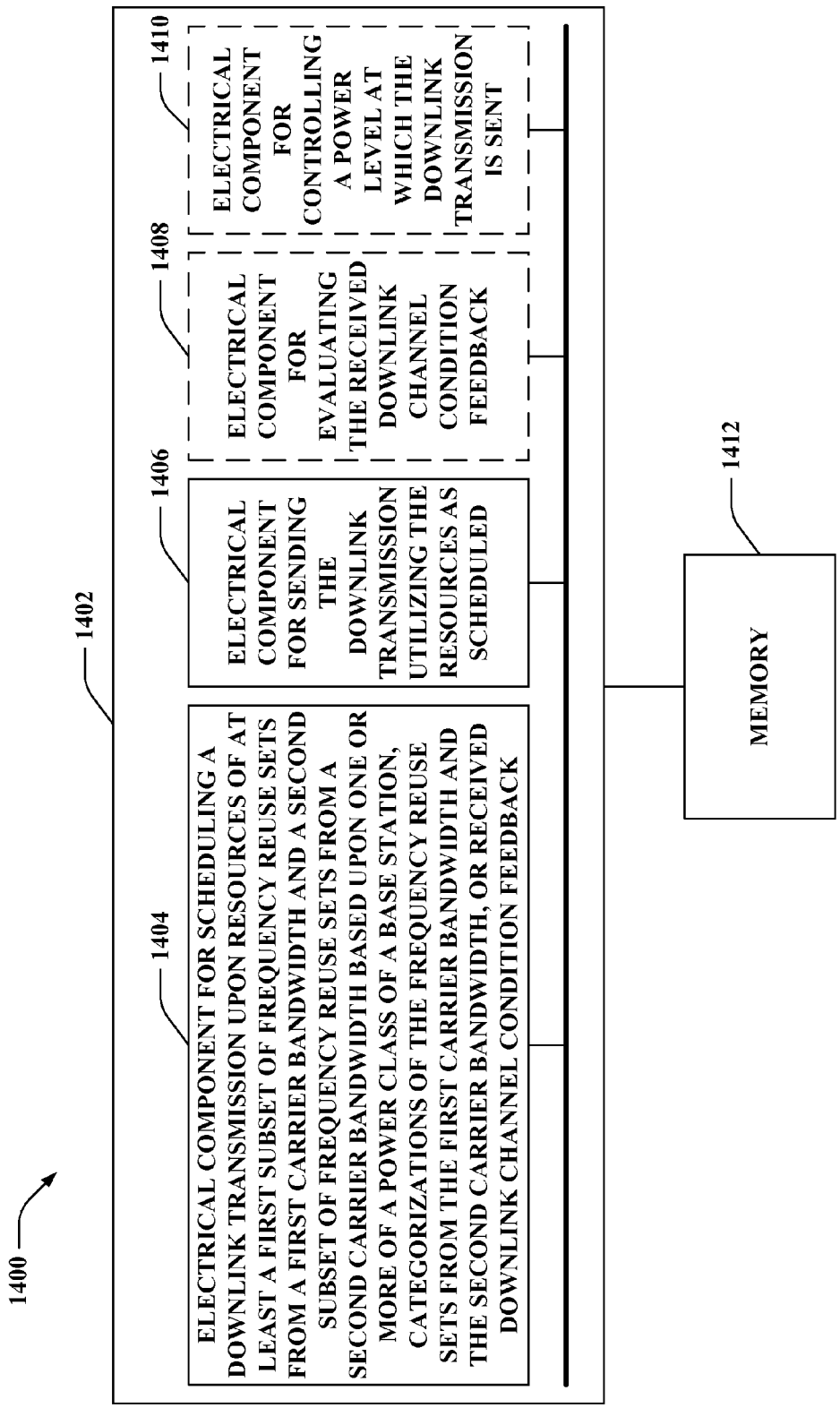
FIG. 14 is an illustration of an example system that enables allocating resources for downlink transmission in a multicarrier heterogeneous wireless communication environment.

With reference to FIG. 14, illustrated is a system 1400 that enables allocating resources for downlink transmission in a multicarrier heterogeneous wireless communication environment. For example, system 1400 can reside at least partially within a base station. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for scheduling a downlink transmission upon resources of at least a first subset of frequency reuse sets from a first carrier bandwidth and a second subset of frequency reuse sets from a second carrier bandwidth based upon one or more of a power class of a base station, categorizations of the frequency reuse sets from the first carrier bandwidth and the second carrier bandwidth, or received downlink channel condition feedback 1404. Moreover, logical grouping 1402 can include an electrical component for sending the downlink transmission utilizing the resources as scheduled 1406. Further, logical grouping 1402 can optionally include an electrical component for evaluating the received downlink channel condition feedback 1408. Logical grouping 1402 can also optionally include an electrical component for controlling a power level at which the downlink transmission is sent 1410. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
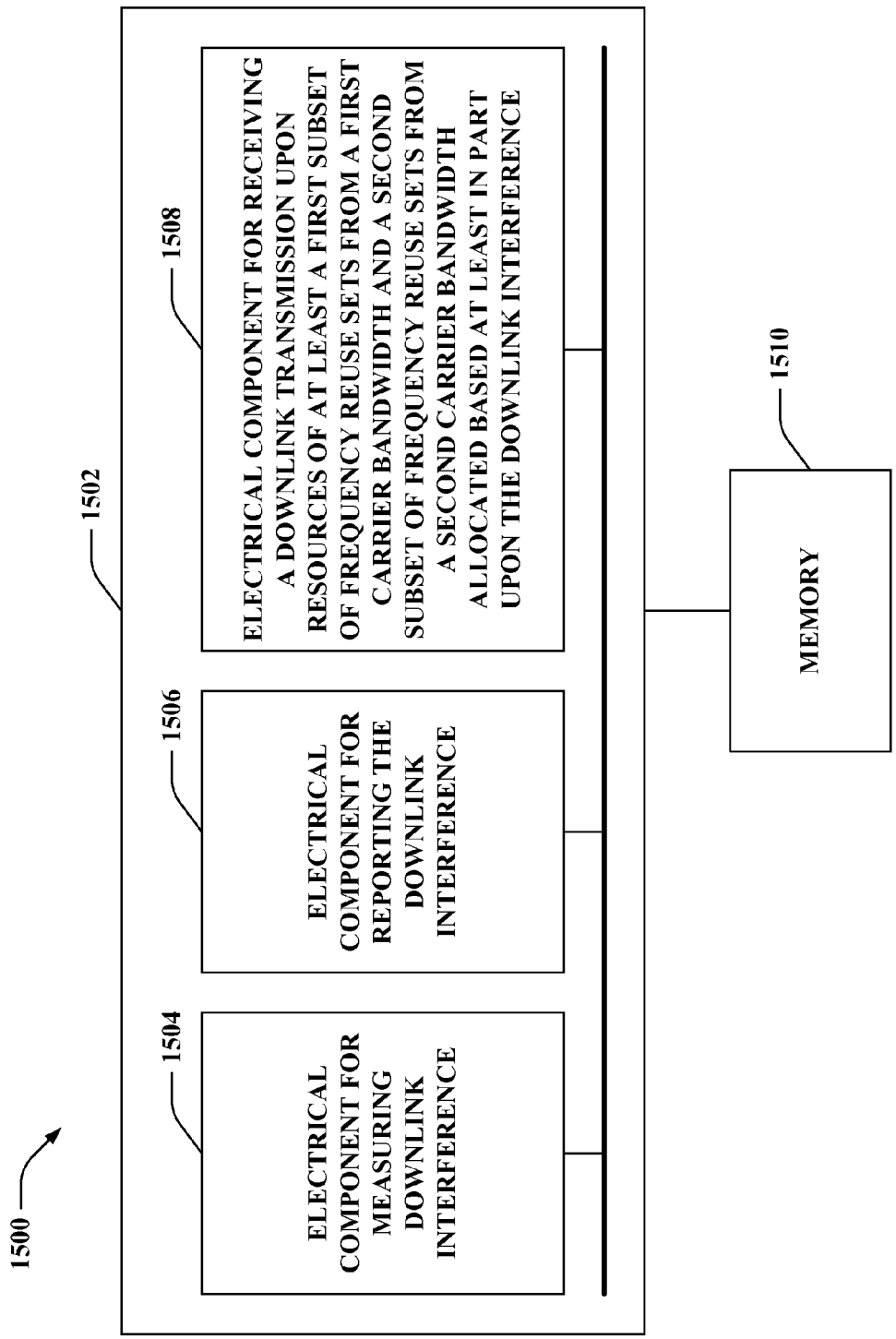
FIG. 15 is an illustration of an example system that enables receiving a downlink transmission in a multicarrier heterogeneous wireless communication environment.

With reference to FIG. 15, illustrated is a system 1500 that enables receiving a downlink transmission in a multicarrier heterogeneous wireless communication environment. For example, system 1500 can reside within an access terminal. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for measuring downlink interference 1504. Moreover, logical grouping 1502 can include an electrical component for reporting the downlink interference 1506. Further, logical grouping 1502 can include an electrical component for receiving a downlink transmission upon resources of at least a first subset of frequency reuse sets from a first carrier bandwidth and a second subset of frequency reuse sets from a second carrier bandwidth allocated based at least in part upon the downlink interference 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates reusing carriers in a multicarrier wireless communication environment, comprising:
   scheduling a downlink transmission upon resources of at least a first subset of frequency reuse sets from a first carrier bandwidth and a second subset of frequency reuse sets from a second carrier bandwidth, wherein the scheduling is based at least in part on categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
   sending the downlink transmission utilizing the resources as scheduled.

2. The method of claim 1, further comprising scheduling the downlink transmission upon the resources of at least the first subset of the frequency reuse sets from the first carrier bandwidth and the second subset of the frequency reuse sets from the second carrier bandwidth based upon an interference level experienced by an access terminal.

3. The method of claim 1, wherein a frequency reuse set of the base station of the first power class is categorized differently as compared to a frequency reuse set of the base station of the second power class.

4. The method of claim 1, further comprising:
   categorizing each of the first subset of frequency reuse sets from the first carrier bandwidth as being for one of unrestricted reuse or restricted reuse further as a function of a carrier power level associated with the first carrier bandwidth; and
   categorizing each of the second subset of frequency reuse sets from the second carrier bandwidth as being for one of unrestricted reuse or restricted reuse further as a function of a carrier power level associated with the second carrier bandwidth.

5. The method of claim 2, further comprising identifying the interference level experienced by the access terminal based upon received feedback.

6. The method of claim 2, wherein the first subset of the frequency reuse sets from the first carrier bandwidth and the second subset of the frequency reuse sets from the second carrier bandwidth include unrestricted reuse sets when the base station of the second power class is a low power base station and the interference level experienced by the access terminal on restricted reuse sets from the first carrier bandwidth and the second carrier bandwidth is above a threshold.

7. The method of claim 2, wherein the first subset of the frequency reuse sets from the first carrier bandwidth and the second subset of the frequency reuse sets from the second carrier bandwidth include unrestricted reuse sets when the base station of the first power class is a high power base station and the interference level experienced by the access terminal on restricted reuse sets from the first carrier bandwidth and the second carrier bandwidth is above a threshold.

8. The method of claim 2, wherein the first subset of the frequency reuse sets from the first carrier bandwidth and the second subset of the frequency reuse sets from the second carrier bandwidth include unrestricted reuse sets and restricted reuse sets when the base station of the second power class is a low power base station and the interference level experienced by the access terminal on the restricted reuse sets from the first carrier bandwidth and the second carrier bandwidth is below a threshold.

9. The method of claim 1, further comprising sending the downlink transmission at a full power level of the base station of the second power class on resources of restricted reuse sets from the first carrier bandwidth and unrestricted reuse sets of the second carrier bandwidth.

10. The method of claim 2, wherein the first subset of the frequency reuse sets from the first carrier bandwidth and the second subset of the frequency reuse sets from the second carrier bandwidth include unrestricted reuse sets and restricted reuse sets when the base station of the first power class is a high power base station and the interference level experienced by the access terminal on the restricted reuse sets from the first carrier bandwidth and the second carrier bandwidth is below a threshold.

11. The method of claim 1, further comprising:
sending the downlink transmission at a full power level of the base station of the first power class on resources of unrestricted reuse sets from the second carrier bandwidth; and
sending the downlink transmission at a lower power level of the base station of the first power class on resources of restricted reuse sets from the first carrier bandwidth.

12. The method of claim 1, further comprising inhibiting transmission from the base station of the first power class upon a reserved first M orthogonal frequency division multiplexing (OFDM) symbols in a sub-frame across a carrier bandwidth for at least one of the first carrier bandwidth or the second carrier bandwidth when the at least one of the first carrier bandwidth or the second carrier bandwidth corresponds to a shared carrier with low power, wherein M is an integer.

13. The method of claim 12, wherein a value of M is at least one of signaled via a Physical Control Format Indicator Channel (PCFICH) or predefined as the integer 3.

14. The method of claim 1, further comprising configuring a reference signal as a function of carrier power level, power class of the base station of the first and second power class, and categorizations of the frequency reuse sets from at least one of the first carrier bandwidth or the second carrier bandwidth.

15. The method of claim 14, wherein configuring the reference signal further comprises selecting at least one of resources used for the reference signal or power level used for the reference signal.

16. The method of claim 15, wherein the reference signal is configured to use at least one of low power on restricted reuse sets or high power on unrestricted reuse sets on a shared carrier with low power for the base station of the first power class.

17. The method of claim 1, further comprising placing a control channel for the base station of the second power class on a shared carrier with unrestricted power within unrestricted reuse sets of the base station of the second power class.

18. A wireless communications apparatus, comprising:
a memory that retains instructions related to scheduling a downlink transmission upon resources of at least a first subset of frequency reuse sets from a first carrier bandwidth and a second subset of frequency reuse sets from a second carrier bandwidth, wherein the scheduling is based at least in part on categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
a processor, coupled to the memory, configured to execute the instructions retained in the memory.

19. The wireless communications apparatus of claim 18, wherein the memory further retains instructions related to recognizing an interference level experienced by an access terminal based upon received feedback.

20. The wireless communications apparatus of claim 18, wherein the first subset of the frequency reuse sets from the first carrier bandwidth and the second subset of the frequency reuse sets from the second carrier bandwidth include unrestricted reuse sets when the base station of the second power class is a low power base station and an interference level experienced by an access terminal on restricted reuse sets from the first carrier bandwidth and the second carrier bandwidth is above a threshold.

21. The wireless communications apparatus of claim 18, wherein the first subset of the frequency reuse sets from the first carrier bandwidth and the second subset of the frequency reuse sets from the second carrier bandwidth include unrestricted reuse sets when the base station of the first power class is a high power base station and an interference level experienced by an access terminal on restricted reuse sets from the first carrier bandwidth and the second carrier bandwidth is above a threshold.

22. The wireless communications apparatus of claim 18, wherein the first subset of the frequency reuse sets from the first carrier bandwidth and the second subset of the frequency reuse sets from the second carrier bandwidth include unrestricted reuse sets and restricted reuse sets when the base station of the second power class is a low power base station and an interference level experienced by an access terminal on the restricted reuse sets from the first carrier bandwidth and the second carrier bandwidth is below a threshold.

23. The wireless communications apparatus of claim 18, wherein the memory further retains instructions related to sending the downlink transmission at a full power level of the base station of the second power class on resources of restricted reuse sets from the first carrier bandwidth and unrestricted reuse sets from the second carrier bandwidth.

24. The wireless communications apparatus of claim 18, wherein the first subset of the frequency reuse sets from the first carrier bandwidth and the second subset of the frequency reuse sets from the second carrier bandwidth include unrestricted reuse sets and restricted reuse sets when the base station of the first power class is a high power base station and an interference level experienced by an access terminal on the restricted reuse sets from the first carrier bandwidth and the second carrier bandwidth is below a threshold.

25. The wireless communications apparatus of claim 18, wherein the memory further retains instructions related to sending the downlink transmission at a full power level of the base station of the first power class on resources of unrestricted reuse sets from the second carrier bandwidth, and sending the downlink transmission at a lower power level of the base station of the first power class on resources of restricted reuse sets from the first carrier bandwidth.

26. The wireless communications apparatus of claim 18, wherein the memory further retains instructions related to inhibiting transmission from the base station of the first power class upon a reserved first M orthogonal frequency division multiplexing (OFDM) symbols in a sub-frame across a carrier bandwidth for at least one of the first carrier bandwidth or the second carrier bandwidth when the at least one of the first carrier bandwidth or the second carrier bandwidth corresponds to a shared carrier with low power, wherein M is an integer.

27. The wireless communications apparatus of claim 26, wherein a value of M is at least one of signaled via a Physical Control Format Indicator Channel (PCFICH) or predefined as the integer 3.

28. The wireless communications apparatus of claim 18, wherein the memory further retains instructions related to configuring a reference signal as a function of carrier power level, the power class of the base station of the first and second power class, and categorizations of the frequency reuse sets from at least one of the first carrier bandwidth or the second carrier bandwidth by selecting at least one of resources used for the reference signal or power level used for the reference signal.

29. The wireless communications apparatus of claim 18, wherein the memory further retains instructions related to placing a control channel for the base station of the second power class on a shared carrier with unrestricted power within unrestricted reuse sets of the base station of the second power class.

30. A wireless communications apparatus that enables allocating resources in a multicarrier wireless communication environment, comprising:
  means for scheduling a downlink transmission upon resources of at least a first subset of frequency reuse sets from a first carrier bandwidth and a second subset of frequency reuse sets from a second carrier bandwidth, wherein the scheduling is based at least in part on categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
  means for sending the downlink transmission utilizing the resources as scheduled.

31. The wireless communications apparatus of claim 30, further comprising means for evaluating an interference level experienced by an access terminal, and wherein the means for scheduling further schedules the downlink transmission based on the interference level experienced by the access terminal.

32. The wireless communications apparatus of claim 30, further comprising means for controlling a power level at which the downlink transmission is sent.

33. A computer program product, comprising:
  a non-transitory computer-readable medium comprising:
    code for assigning resources of at least a first subset of frequency reuse sets from a first carrier bandwidth and a second subset of frequency reuse sets from a second carrier bandwidth for a downlink transmission, wherein the resources are assigned based at least in part on categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
    code for sending the downlink transmission via the resources as assigned.

34. The computer program product of claim 33, wherein the resources are assigned based upon an interference level indicated by an access terminal.

35. The computer program product of claim 33, wherein the computer-readable medium further comprises code for controlling a power level at which the downlink transmission is sent.

36. A wireless communications apparatus, comprising:
  a processor configured to:
    recognize an interference level experienced by an access terminal based upon received feedback;
    schedule a downlink transmission upon resources of at least a first subset of frequency reuse sets from a first carrier bandwidth and a second subset of frequency reuse sets from a second carrier bandwidth, wherein the scheduling is based at least in part on categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
    send the downlink transmission utilizing the resources as scheduled.

37. A method that facilitates operating in a multicarrier wireless communication environment, comprising:
  monitoring downlink channel conditions;
  transmitting feedback corresponding to the downlink channel conditions; and
  receiving a downlink transmission upon resources of at least a first subset of frequency reuse sets from a first carrier bandwidth and a second subset of frequency reuse sets from a second carrier bandwidth assigned based at least in part upon the feedback and categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class.

38. The method of claim 37, wherein each of the frequency reuse sets is categorized as being for one of unrestricted reuse or restricted reuse as a function of respective carrier power levels.

39. The method of claim 37, wherein the first subset of the frequency reuse sets from the first carrier bandwidth and the second subset of the frequency reuse sets from the second carrier bandwidth include unrestricted reuse sets when the base station of the second power class is a low power base station and the downlink channel conditions on restricted reuse sets from the first carrier bandwidth and the second carrier bandwidth are above a threshold.

40. The method of claim 37, wherein the first subset of the frequency reuse sets from the first carrier bandwidth and the second subset of the frequency reuse sets from the second carrier bandwidth include unrestricted reuse sets when the base station of the first power class is a high power base station and the downlink channel conditions on restricted reuse sets from the first carrier bandwidth and the second carrier bandwidth are above a threshold.

41. The method of claim 37, wherein the first subset of the frequency reuse sets from the first carrier bandwidth and the second subset of the frequency reuse sets from the second carrier bandwidth include unrestricted reuse sets and restricted reuse sets when the base station of the second power class is a low power base station and the downlink channel conditions on the restricted reuse sets from the first carrier bandwidth and the second carrier bandwidth are below a threshold.

42. The method of claim 37, wherein the first subset of the frequency reuse sets from the first carrier bandwidth and the second subset of the frequency reuse sets from the second carrier bandwidth include unrestricted reuse sets and restricted reuse sets when the base station of the first power class is a high power base station and the downlink channel conditions on the restricted reuse sets from the first carrier bandwidth and the second carrier bandwidth are below a threshold.

43. A wireless communications apparatus, comprising:
a memory that retains instructions related to monitoring downlink channel conditions, transmitting feedback corresponding to the downlink channel conditions, and receiving a downlink transmission upon resources of at least a first subset of frequency reuse sets from a first carrier bandwidth and a second subset of frequency reuse sets from a second carrier bandwidth assigned based upon the feedback and categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class; and
a processor, coupled to the memory, configured to execute the instructions retained in the memory.

44. The wireless communications apparatus of claim 43, wherein each of the frequency reuse sets is categorized as being for one of unrestricted reuse or restricted reuse as a function of respective carrier power levels.

45. The wireless communications apparatus of claim 43, wherein the memory further retains instructions related to monitoring the downlink channel conditions for each of the frequency reuse sets from the first carrier bandwidth and the second carrier bandwidth.

46. A wireless communications apparatus that enables operating in a multicarrier wireless communication environment, comprising:
means for measuring downlink interference;
means for reporting the downlink interference; and
means for receiving a downlink transmission upon resources of at least a first subset of frequency reuse sets from a first carrier bandwidth and a second subset of frequency reuse sets from a second carrier bandwidth allocated based at least in part upon the downlink interference and categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class.

47. The wireless communications apparatus of claim 46, wherein each of the frequency reuse sets is categorized as being for one of unrestricted reuse or restricted reuse as a function of respective carrier power levels.

48. A computer program product, comprising:
a non-transitory computer-readable medium comprising:
code for reporting measured downlink interference; and
code for obtaining a downlink transmission upon resources of at least a first subset of frequency reuse sets from a first carrier bandwidth and a second subset of frequency reuse sets from a second carrier bandwidth allocated based at least in part upon the measured downlink interference and categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class.

49. The computer program product of claim 48, wherein each of the frequency reuse sets is categorized as being for one of unrestricted reuse or restricted reuse as a function of respective carrier power levels.

50. A wireless communications apparatus, comprising:
a processor configured to:
monitor downlink channel conditions;
transmit feedback corresponding to the downlink channel conditions; and
receive a downlink transmission upon resources of at least a first subset of frequency reuse sets from a first carrier bandwidth and a second subset of frequency reuse sets from a second carrier bandwidth assigned based upon the feedback and categorizations of the first subset of frequency reuse sets from the first carrier bandwidth as being for restricted reuse for a base station of a first power class and unrestricted reuse for a base station of a second power class, and is based at least in part on categorizations of the second subset of frequency reuse sets from the second carrier bandwidth as being for unrestricted reuse for the base station of the first power class, and wherein the base station of the second power class is at least partially within a coverage area of the base station of the first power class.

* * * * *